(12) United States Patent
Krishnamurthy et al.

(10) Patent No.: US 6,430,317 B1
(45) Date of Patent: Aug. 6, 2002

(54) METHOD AND APPARATUS FOR ESTIMATING MOTION USING BLOCK FEATURES OBTAINED FROM AN M-ARY PYRAMID

(75) Inventors: Ravi Krishnamurthy, Plainsboro; Sriram Sethuraman, Hightstown, both of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/196,072

(22) Filed: Nov. 19, 1998

Related U.S. Application Data

(63) Continuation-in-part of application No. 09/002,258, filed on Dec. 31, 1997.
(60) Provisional application No. 60/080,536, filed on Apr. 3, 1998.

(51) Int. Cl.[7] .................................................. G06R 9/36
(52) U.S. Cl. ..................................................... 382/236
(58) Field of Search .................. 375/240.17, 240.19; 348/397, 398, 384, 394, 395, 400–404, 407–416, 420, 421, 425, 430, 431, 699, 700; 382/232, 236, 238, 240, 242, 248, 250; 358/432, 433

(56) References Cited

U.S. PATENT DOCUMENTS

| | | | | |
|---|---|---|---|---|
| 5,099,325 A | * | 3/1992 | Artieri et al. | 348/400 |
| 5,565,920 A | * | 10/1996 | Lee et al. | 348/498 |
| 5,969,764 A | * | 10/1999 | Sun et al. | 348/404 |
| 6,208,692 B1 | * | 3/2001 | Song et al. | 375/240.19 |

OTHER PUBLICATIONS

Lee et al., "A Fast Hierarchical Motion–Compensation Scheme for Video Coding Using Block Feature Matching"IEEE, pp. 627–635, 1996.*
Nam et al A Fast Hierarchical Motion Vector Estimation Algorith Using Mean pyramid, IEEE pp. 344–351, 1995.*
Chan et al., Block Motion Vector Estimation Using Edge Matching: An Approach With Better Frame Quality as Compared to Full Search Algorithum, IEEE, pp. 1146–1149, 1997.*

* cited by examiner

*Primary Examiner*—Jose L. Couso
(74) *Attorney, Agent, or Firm*—William J. Burke

(57) ABSTRACT

An apparatus and method for reducing memory resource requirements in, e.g., an image processing system by utilizing a packed data pixel representation and, optionally, M-ary pyramid decomposition, for pixel block or pixel group searching and matching operations.

24 Claims, 9 Drawing Sheets

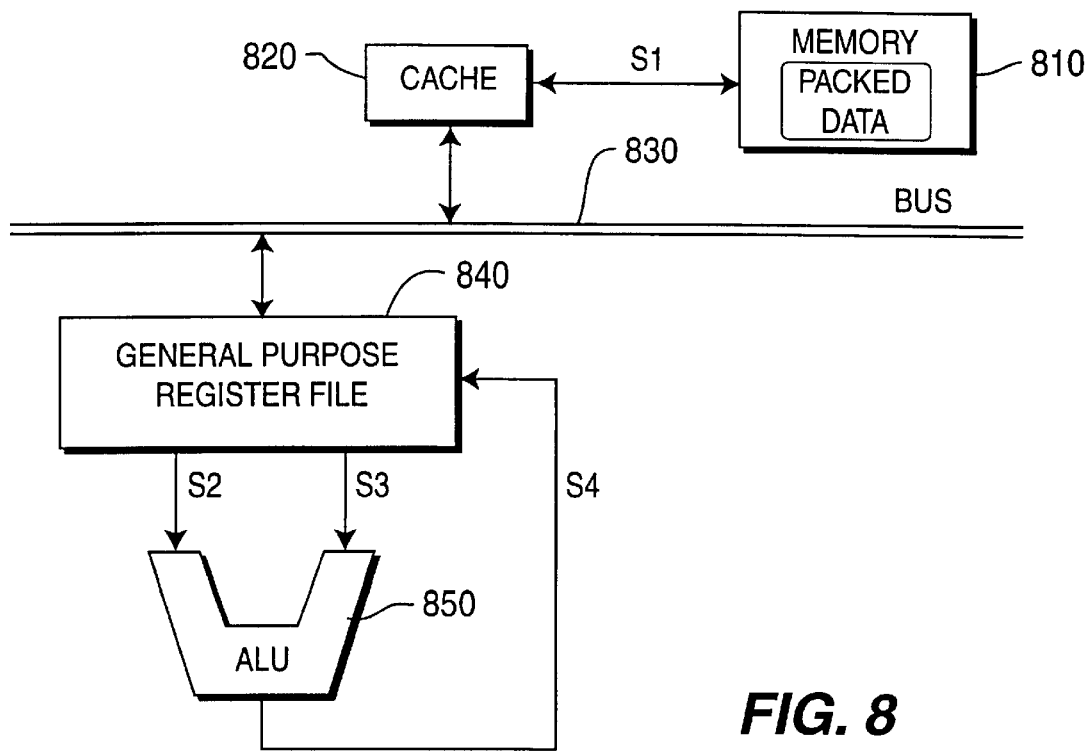
FIG. 8
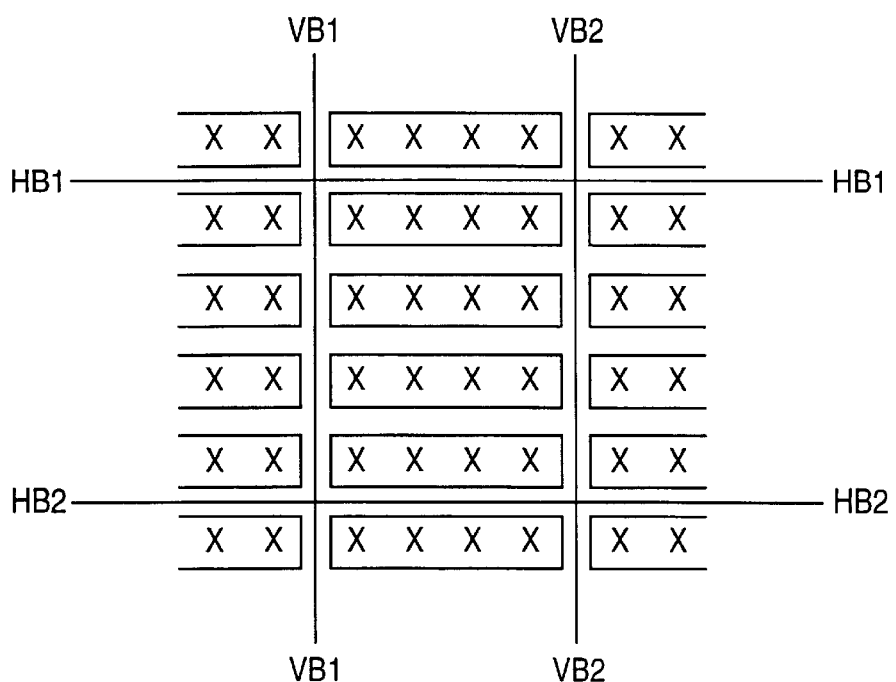
FIG. 9
X = ONE PIXEL HAVING M-STATES
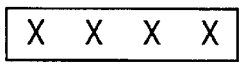 = FOUR PIXELS PACKED INTO A WORD

METHOD AND APPARATUS FOR ESTIMATING MOTION USING BLOCK FEATURES OBTAINED FROM AN M-ARY PYRAMID

This application is a continuation in part of U.S. patent application Ser. No. 09/002,258, allowed, filed on Dec. 31, 1997 for APPARATUS AND METHOD FOR EMPLOYING M-ARY PYRAMIDS TO ENHANCE FEATURE-BASED CLASSIFICATION AND MOTION ESTIMATION, which is herein incorporated by reference in its entirety.

This application claims the benefit of U.S. Provisional Application No. 60/080,536, filed Apr. 3, 1998, which is herein incorporated by reference in its entirety.

The invention relates to communications systems generally and, more particularly, the invention relates to a method and apparatus for estimating motion using block features obtained from an M-ary pyramid in a manner efficiently utilizing an available memory bandwidth.

BACKGROUND OF THE INVENTION

An image sequence, such as a video image sequence, typically includes a sequence of image frames or pictures. The reproduction of video containing moving objects typically requires a frame speed of thirty image frames per second, with each frame possibly containing in excess of a megabyte of information. Consequently, transmitting or storing such image sequences requires a large amount of either transmission bandwidth or storage capacity. To reduce the necessary transmission bandwidth or storage capacity, the frame sequence is compressed such that redundant information within the sequence is not stored or transmitted. Television, video conferencing and CD-ROM archiving are examples of applications which can benefit from efficient video sequence encoding.

Generally, to encode an image sequence, information concerning the motion of objects in a scene from one frame to the next plays an important role in the encoding process. Because of the high redundancy that exists between consecutive frames within most image sequences, substantial data compression can be achieved using a technique known as motion estimation/compensation. In brief, the encoder only encodes the differences relative to areas that are shifted with respect to the areas coded. Namely, motion estimation is a process of determining the direction and magnitude of motion (motion vectors) for an area (e.g., a block or macroblock) in the current frame relative to one or more reference frames. Whereas, motion compensation is a process of using the motion vectors to generate a prediction (predicted image) of the current frame. The difference between the current frame and the predicted frame results in a residual signal (error signal), which contains substantially less information than the current frame itself. Thus, a significant saving in coding bits is realized by encoding and transmitting only the residual signal and the corresponding motion vectors.

To illustrate, in a sequence containing motion, a current frame can be reconstructed using an immediately preceding frame and the residual signal representing the difference between the current and the immediately preceding frame. The transmitter or encoder transmits the preceding frame, the residual signal and the corresponding motion vectors to a receiver. At the receiver, the current frame is reconstructed by combining the preceding frame with the residual signal and the motion information. Consequently, only one (1) frame and the difference information with its associated motion vectors are transmitted and received rather than two (2) entire frames.

However, encoder designers must address the dichotomy of attempting to increase the precision of the motion estimation process to minimize the residual signal (i.e., reducing coding bits) or accepting a lower level of precision in the motion estimation process to minimize the computational overhead. Namely, determining the motion vectors from the frame sequence requires intensive searching between frames to determine the motion information. A more intensive search will generate a more precise set of motion vectors at the expense of more computational cycles.

For example, many systems determine motion information using a so-called block based approach. In a simple block based approach, the current frame is divided into a number of blocks of pixels (referred to hereinafter as the current blocks). For each of these current blocks, a search is performed within a selected search area in the preceding frame for a block of pixels that "best" matches the current block. This search is typically accomplished by repetitively comparing a selected current block to similarly sized blocks of pixels in the selected search area of the preceding frame. Once a block match is found, the location of matching block in the search area in the previous frame relative to the location of the current block within the current frame defines a motion vector. This approach, i.e., comparing each current block to an entire selected search area, is known as a full search approach or the exhaustive search approach. The determination of motion vectors by the exhaustive search approach is computationally intensive, especially where the search area is particularly large. A such, these systems tend to be relatively slow in processing the frames and expensive to fabricate.

Therefore, there is a need in the art for an apparatus and a concomitant method for reducing the computational complexity in determining motion vectors for block-based motion estimation.

SUMMARY OF THE INVENTION

The present invention is a method for reducing memory resource requirements in, e.g., an image processing system. Specifically, in one embodiment of the invention suitable for use in estimating motion vectors, memory resource requirements are reduced by creating mean and/or M-ary pyramids; packing and storing in memory the data representative of the created mean and/or M-ary pyramids; moving the packed data into registers for use in arithmetic calculations; and using the packed data for arithmetic calculations such as matching error calculations.

BRIEF DESCRIPTION OF THE DRAWINGS

The teachings of the present invention can be readily understood by considering the following detailed description in conjunction with the accompanying drawings, in which:

FIG. 8 illustrates a portion of a computing device useful in understanding the invention;

FIGS. 9–11 illustrate packed or blocked data representations of pixel information useful in understanding the present invention;

To facilitate understanding, identical reference numerals have been used, where possible, to designate identical elements that are common to the figures.

DETAILED DESCRIPTION

Figure 1:
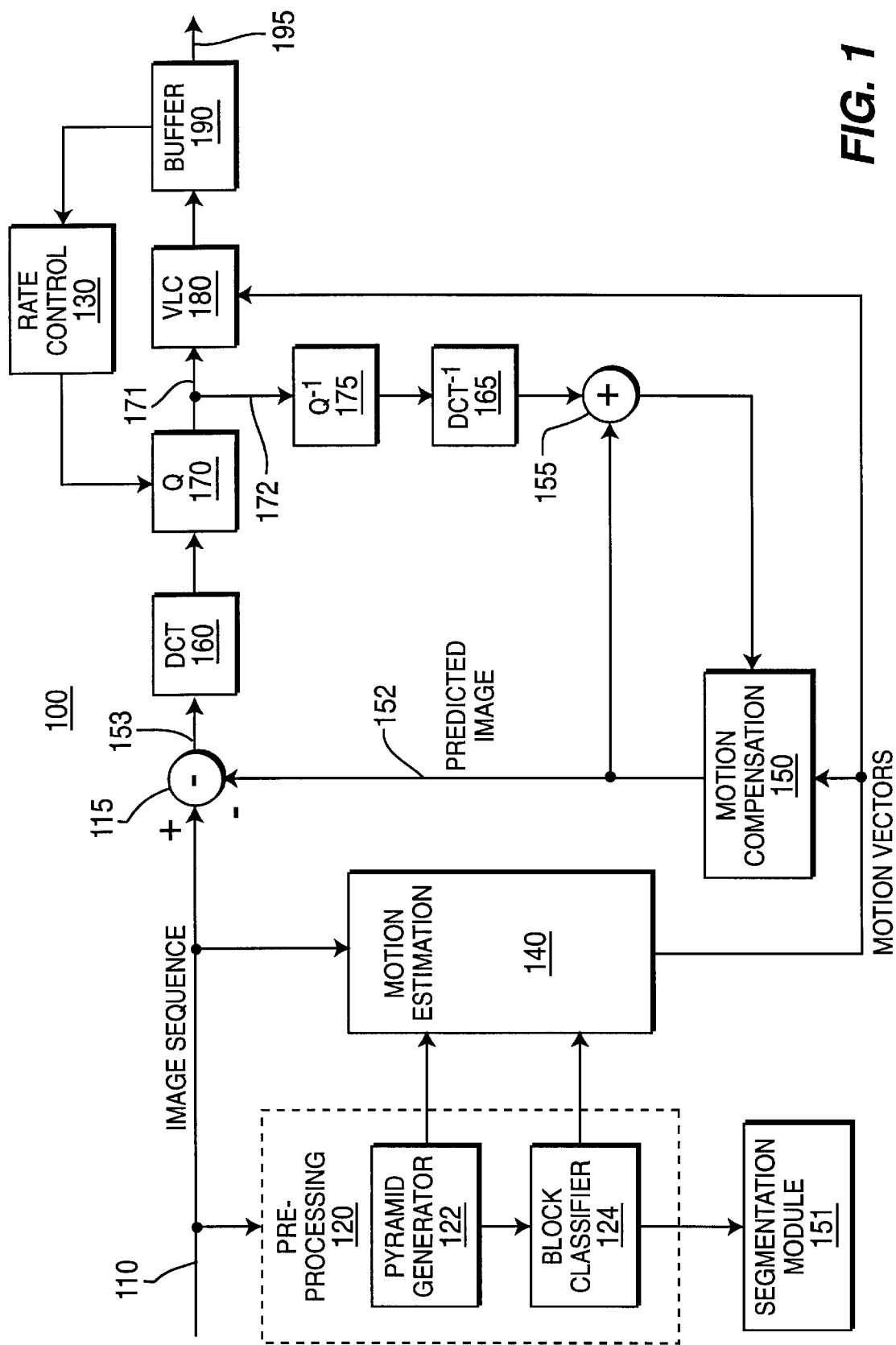
FIG. 1 illustrates a block diagram of the encoder of the present invention for reducing the computational complexity in determining motion vectors for block-based motion estimation.

FIG. 1 depicts a block diagram of the apparatus 100 of the present invention for reducing the computational complexity in determining motion vectors for block-based motion estimation. The preferred embodiment of the present invention is described below using an encoder, but it should be understood that the present invention can be employed in image processing systems in general. Furthermore, the present invention can be employed in encoders that are in compliant with various coding standards. These standards include, but are not limited to, the Moving Picture Experts Group Standards (e.g., MPEG-1 (11172-*) and MPEG-2 (13818-*), H.261 and H.263.

The apparatus 100 is an encoder or a portion of a more complex block-based motion compensated coding system. The apparatus 100 comprises a motion estimation module 140, a motion compensation module 150, an optional segmentation module 151, a preprocessing module 120, a rate control module 130, a transform module, (e.g., a DCT module) 160, a quantization module 170, a coder, (e.g., a variable length coding module) 180, a buffer 190, an inverse quantization module 175, an inverse transform module (e.g., an inverse DCT module) 165, a subtractor 115 and a summer 155. Although the encoder 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an embedded decoder.

FIG. 1 illustrates an input image (image sequence) on path 110 which is digitized and represented as a luminance and two color difference signals ($Y$, $C_r$, $C_b$) in accordance with the MPEG standards. These signals are further divided into a plurality of layers such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below).

In the preferred embodiment, the digitized input image signal undergoes one or more preprocessing steps in the preprocessing module 120. More specifically, preprocessing module 120 comprises a pyramid generator 122 and a block classifier 124. The pyramid generator 122 decomposes or filters each frame into a plurality of different resolutions, i.e., a pyramid of resolutions, where the different resolutions of each frame are correlated in a hierarchical fashion as described below. In turn, using the pyramid of resolutions, the block classifier 124 is able to quickly classify areas (blocks) as areas of high activity or low activity. A detailed description is provided below for the functions performed by the preprocessing module 120.

The input image on path 110 is also received into motion estimation module 140 for estimating motion vectors. A motion vector is a two-dimensional vector which is used by motion compensation to provide an offset from the coordinate position of a block in the current picture to the coordinates in a reference frame. The use of motion vectors greatly enhances image compression by reducing the amount of information that is transmitted on a channel because only the changes within the current frame are coded and transmitted. In the preferred embodiment, the motion estimation module 140 also receives information from the preprocessing module 120 to enhance the performance of the motion estimation process.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values, and is used to form the prediction error. Namely, the motion compensation module 150 uses the previously decoded frame and the motion vectors to construct an estimate (motion compensated prediction or predicted image) of the current frame on path 152. This motion compensated prediction is subtracted via subtractor 115 from the input image on path 110 in the current macroblocks to form an error signal (e) or predictive residual on path 153.

The predictive residual signal is passed to a transform module, e.g., a DCT module 160. The DCT module then applies a forward discrete cosine transform process to each block of the predictive residual signal to produce a set of eight (8) by eight (8) block of DCT coefficients. The discrete cosine transform is an invertible, discrete orthogonal transformation where the DCT coefficients represent the amplitudes of a set of cosine basis functions.

The resulting 8×8 block of DCT coefficients is received by quantization (Q) module 170, where the DCT coefficients are quantized. The process of quantization reduces the accuracy with which the DCT coefficients are represented by dividing the DCT coefficients by a set of quantization values or scales with appropriate rounding to form integer values. The quantization values can be set individually for each DCT coefficient, using criteria based on the visibility of the basis functions (known as visually weighted quantization). By quantizing the DCT coefficients with this value, many of the DCT coefficients are converted to zeros, thereby improving image compression efficiency.

Next, the resulting 8×8 block of quantized DCT coefficients is received by a coder, e.g., variable length coding module 180 via signal connection 171, where the two-dimensional block of quantized coefficients is scanned in a "zigzag" order to convert it into a one-dimensional string of quantized DCT coefficients. Variable length coding (VLC) module 180 then encodes the string of quantized DCT coefficients and all side-information for the macroblock such as macroblock type and motion vectors. Thus, the VLC module 180 performs the final step of converting the input image into a valid data stream.

The data stream is received into a buffer, e.g., a "First In-First Out" (FIFO) buffer 190. A consequence of using different picture types and variable length coding is that the overall bit rate is variable. Namely, the number of bits used to code each frame can be different. Thus, in applications that involve a fixed-rate channel, a FIFO buffer is used to match the encoder output to the channel for smoothing the bit rate. Thus, the output signal on path 195 from FIFO buffer 190 is a compressed representation of the input image 110, where it is sent to a storage medium or a telecommunication channel.

The rate control module 130 serves to monitor and adjust the bit rate of the data stream entering the FIFO buffer 190 to prevent overflow and underflow on the decoder side (within a receiver or target storage device, not shown) after transmission of the data stream. A fixed-rate channel is assumed to carry bits at a constant rate to an input buffer within the decoder (not shown). At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the rate control module 130 to monitor the status of buffer 190 to control the number of bits generated by the encoder, thereby preventing the overflow and underflow conditions. A rate control method may control the number of coding bits by adjusting the quantization scales.

Furthermore, the resulting 8×8 block of quantized DCT coefficients from the quantization module 170 is received by the inverse quantization module 175 and inverse DCT module 165 via signal connection 172. In brief, at this stage, the encoder regenerates I-frames and P-frames of the image sequence by decoding the data so that they are used as reference frames for subsequent encoding.

Figure 2:
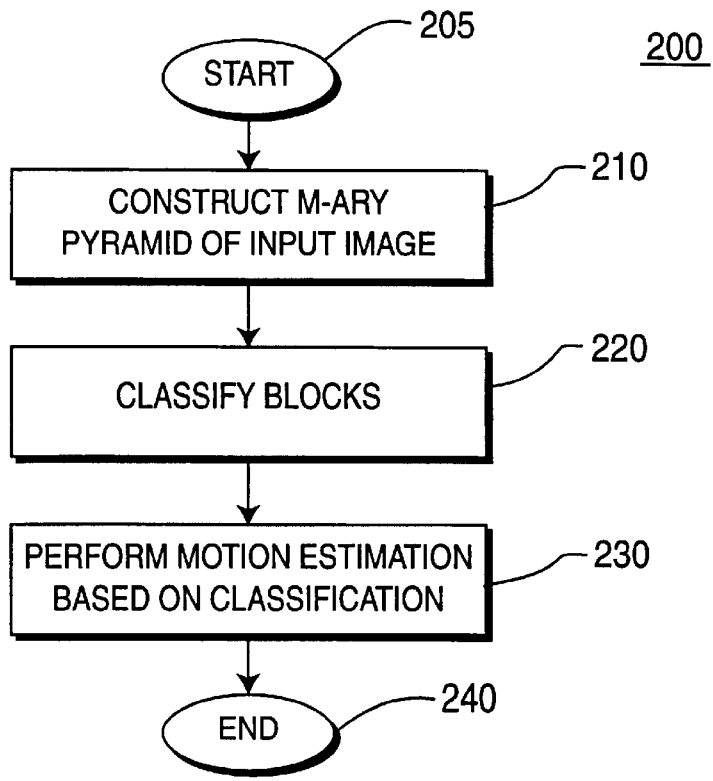
FIG. 2 illustrates a flowchart of a method for reducing the computational complexity in determining motion vectors for block-based motion estimation.

FIG. 2 illustrates a flowchart of a method 200 for reducing the computational complexity in determining motion vectors for block-based motion estimation. Namely, the method 200 enhances a block-based motion estimation method by quickly defining an initial search area where a match will likely occur.

Figure 3:
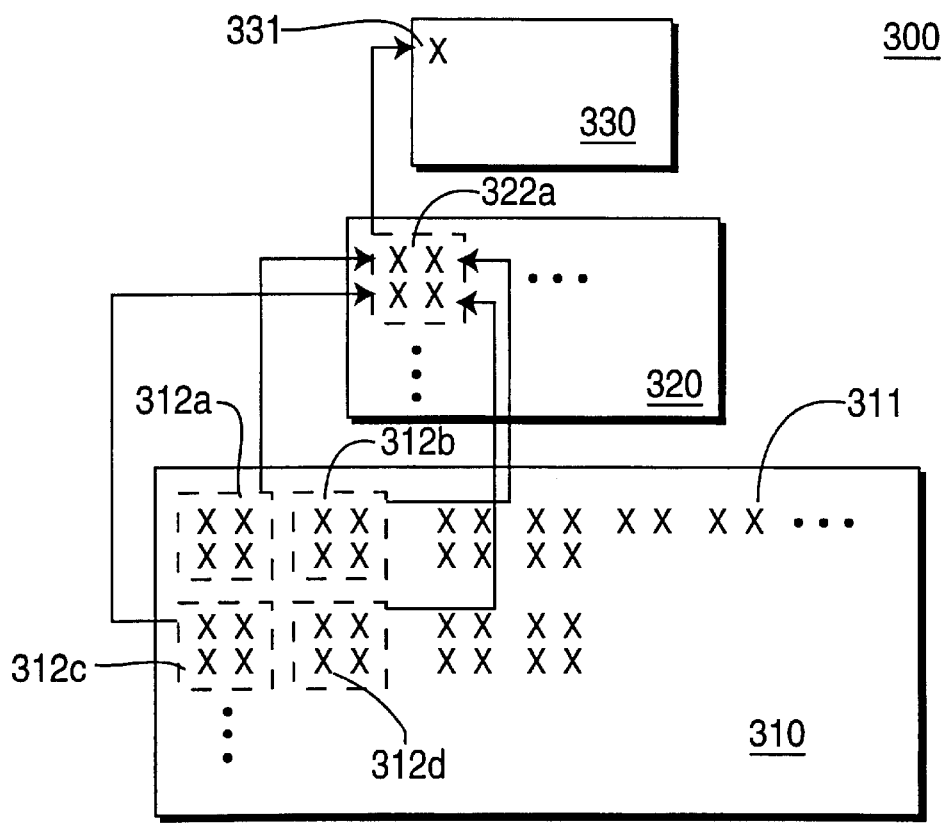
FIG. 3 illustrates a block diagram of a general mean pyramid.

More specifically, the method 200 starts in step 205 and proceeds to step 210 where a M-ary pyramid (or M-ary mean pyramid) is generated for each image frame in the image sequence. FIG. 3 illustrates a block diagram of a general mean pyramid 300, where the mean pyramid comprises a plurality of levels 310, 320 and 330. The lowest level 310 is an original image frame from the image sequence having a plurality of pixels 311 represented by "x"'s. Typically, these pixels are represented by pixel values having a range that is limited by the number of bits allocated to represent the pixel values. For example, if eight (8) bits are allocated, then a pixel value may take a value from one of 256 possible values.

In a mean pyramid, a next higher level is generated by lowpass filtering and down sampling by a factor of two in both directions, thereby generating a single pixel value (parent) for a higher level from four (4) pixel values (children) in a lower level. This is illustrated in FIG. 3, where each set of four pixels 312*a–d* is used to generate a single pixel value 321 in level 320. In turn, the set of four pixel values 322*a* is used to generate a single pixel value 331 in level 330 and so on. It should be understood that the present invention is not limited to a mean pyramid having three levels. The number of levels is generally limited by the size of the image and the downsampling factor selected to generate the next lower resolution image. Thus, the number of levels in the mean pyramid can be selected for a particular application.

In a mean pyramid, the parent pixel value is derived by taking the average of its four children pixel values, thus the term mean pyramid. However, other measure or metric can be used to generate other types of pyramids, e.g., the measure can be based on the median of the four children pixel values. Alternatively, a larger area around the children pixels can be used for a weighted average to obtain a general lowpass pyramid.

In a M-ary pyramid, the pixel values are quantized such that each quantized pixel value can only take "M" possible pixel values. For example, if M equals to two (2), then each quantized pixel value, can take on a value of 0 or 1, i.e., resulting in a "binary pyramid".

Figure 4:
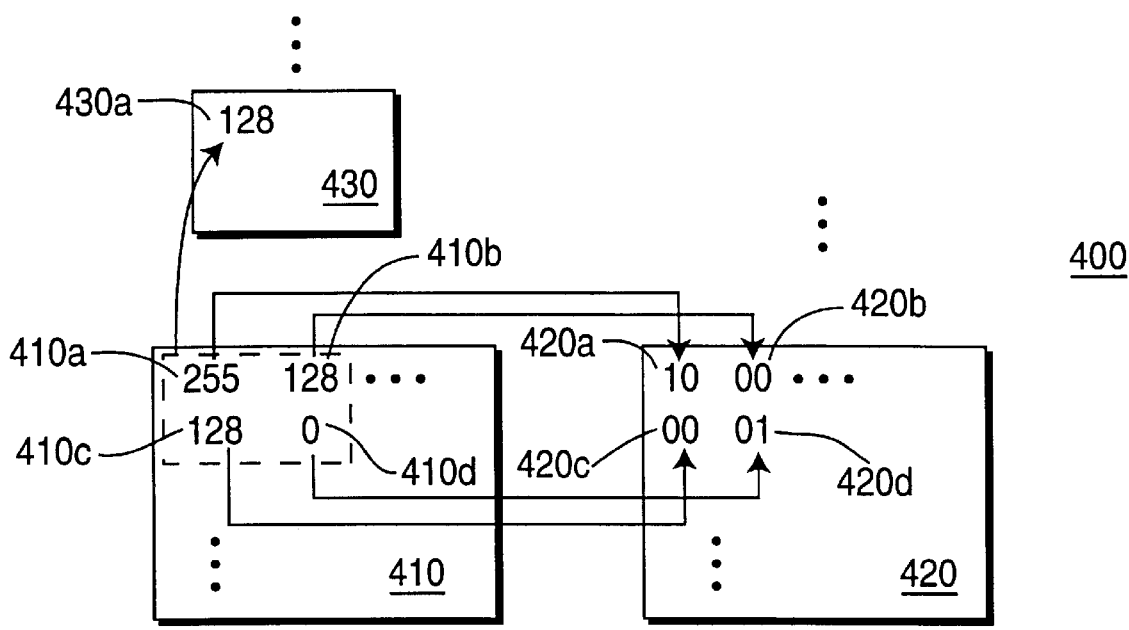
FIG. 4 illustrates a block diagram of the quantization process that generates a M-ary pyramid.

FIG. 4 illustrates a block diagram of the quantization process that generates a ternary pyramid, where M equals to three (3). More specifically, an eight-bit pixel value 255 (410*a*) is quantized into a two-bit pixel value 10 (420*a*) based on the difference between the child and parent pixels. Namely, a difference is computed between a parent 430*a* and each of its children 410*a–d*, where each of the four (4) differences is then quantized into three possible values 10, 00, and 01. Thus, pixel value 128 (410*b* and 410*c*) is quantized into a pixel value 00 (420*b* and 420*c*) and pixel value 0 (410*d*) is quantized into a pixel value 01 (420*d*). These representation levels are suitable for the bit wise XOR based cost function that will be used for motion estimation. They are also useful for feature detection and block classification. The M-ary pyramid reduces accuracy of the pixel values, thereby allowing rapid detection of "features" within an image. Features are defined as areas of high activities or intensity, e.g., the edges of an object. It should be noted that the levels 410 and 430 are levels of a mean pyramid, while level 420 is a level of a M-ary pyramid (where M=3). Both of these pyramids may have additional levels as illustrated in FIG. 4, but the M-ary pyramid will always have one level less than the mean pyramid. Namely, one needs two mean pyramid levels 410 and 430 to generate a single M-ary pyramid level 420.

Furthermore, the significant reduction in the number of bits used to represent the pixel values translates into a reduction in computational overhead in the motion estimation process. For example, the block matching operation performed in the motion estimation process can be accelerated since there are fewer possible values that a pixel value can take on, thereby simplifying the overall block matching process.

Although M can be any value, it has been found that a binary pyramid decomposition is sensitive to noise. Namely, since the quantized pixel values can only take one of two possible values, noise can introduce errors, where a pixel value can be erroneously interpreted as having a value 1 instead of 0 or vice versa. Such over sensitivity causes erroneous interpretation of the presence or absence of a feature. Thus, it has been found that a M-ary pyramid decomposition is best employed when M is greater than 2.

It should be understood that the important aspect in step 210 is the generation of a M-ary pyramid for each of the input images in the image sequence. As such, although the preferred embodiment generates a M-ary mean pyramid, other types of M-ary pyramids can be employed in the present invention, e.g., a M-ary median pyramid, M-ary Lowpass pyramid and so on.

Alternately, the inventive concept of a M-ary mean pyramid decomposition can be expressed in equation form. Let (i, j) represent the pixel locations on an image frame and let I(i, j) represent the intensity at location (i, j). Further, let l indicate the level within a pyramid, with $0=l=L$, where L is the highest level in the pyramid. Then, the mean pyramids $X^l(i, j)$, $1=l=L$ are constructed as follows:

$$X^l(i, j) = \frac{1}{4} \sum_{m=0}^{1} \sum_{n=0}^{1} X^{l-1}(2i+m, 2j+n) \quad (1)$$

where $X^0(i, j)=I(i, j)$.

From these mean pyramids, features within a block can extracted in step 220 below. In the preferred embodiment, the block is a 8×8 subblock of a macroblock, but it should be understood that the present invention is not limited to this block size. In particular, features like edges can be extracted from the variation of intensities within a block. This variation is represented by calculating the difference between the mean value at a level 1, $0=l=L-1$ and the mean value at level l+1. However, in order to obtain a robust feature, and in order to facilitate fast motion estimation, this difference is quantized using M levels and represent the quantized values using $\log_2 M$ bits. This will create a pattern over the image that is used to identify image features like edges and zero-crossings. Denoting this pattern value by $Y^l(i, j)$:

$$Y^l(i, j) = Quant\left[X^l(i, j) - X^{l+1}\left(INT\left(\frac{i}{2}\right), INT\left(\frac{j}{2}\right)\right)\right], 0 \le l \le L-1 \quad (2)$$

Denote the argument of Quant[?] by λ. For example, consider the case of ternary pyramids having a threshold T, and define $Y^l(i, j)$ as follows:

$$Y^l(i, j) = \begin{cases} 00 & |\lambda| < T \\ 01 & \lambda > T \\ 10 & \lambda < -T \end{cases} \quad (3)$$

This definition has the advantage of noise-robustness if the quantization threshold T (e.g., in the preferred embodiment T is selected to 5) is suitably chosen for a particular application. Namely, it is possible to define a "dead zone", e.g., $|\lambda|<T$, where slight variations in the pixel values due to noise can be removed effectively. Thus, any M-ary pyramids (M>2) having a dead zone around zero will minimize the noise sensitivity problem as seen in the binary pyramid.

In relatively flat areas (areas of low activities), $Y^1(i, j)$ will contain a large number of zeros (0), while in regions containing edges, $Y^1(i, j)$ will contain a number of ones (1). Once the input image is decomposed into a M-ary pyramid, the blocks in the input image can be classified for the purpose of feature extraction using the M-ary pyramid, $Y^1(i, j)$. Namely, the M-ary pyramid can be used to rapidly detect features in the input image without incurring a high computational overhead. The detected features can be used to enhance the motion estimation process as discussed below or other image processing steps, e.g., segmentation of areas (such as objects) within an image, e.g., by using segmentation module 151. Segmentation is an important image processing step, where important areas in the image can be identified to receive special treatment. For example, the face of a person during a video conferencing application may demand special image processing such as receiving a greater allocation of coding bits. Additionally, segmentation can be employed to identify large objects where global motion estimation can be performed on these large objects.

It should be understood that the preceding discussion uses the ternary pyramid as an example and shows one possible method in which the quantization thresholds or levels can be assigned for feature identification and classification. In general, M-ary pyramids with M>2 can be used with the specific assignment of the quantization thresholds being dependent on the requirement of a particular application and/or the content of the image sequence.

Returning to FIG. 2, after the M-ary pyramid is generated, method 200 proceeds to step 220 where the blocks in the frame are classified in terms of low activity or high activity in view of the M-ary pyramid. In the preferred embodiment, the "classification block size" is a 8×8 block having 64 M-ary pixel values represented by 128 bits. An "activity threshold" of 25 is set where the 8×8 block is classified as a high activity block if 25 or more pixel values are nonzero. Otherwise, the 8×8 block is classified as a low activity block. Additional higher block classification can be performed, e.g., classifying a macroblock as either a high activity or low activity macroblock. In the preferred embodiment, a macroblock comprising at least one subblock that is classified as high activity, causes the macroblock to be classified as high activity as well. It should be understood that the "classification block size" and the "activity threshold" can be adjusted according to a particular application and are not limited to those values selected in the preferred embodiment.

Returning to FIG. 2, after block classification, method 200 proceeds to step 230 where the block classifications are used to enhance the motion estimation process. Generally, motion estimates in areas with significant image features are more reliable than motion estimates in relatively "flat areas" with little changes due to the aperture problem (e.g., uniform areas where the content of the image are very similar for adjacent blocks). Therefore, the classification method described above is used to increase the reliability of motion estimates in general. Namely, it should be understood that the present invention can be employed to enhance the performance of various types or different architectures of motion estimation methods.

More specifically, motion estimation is generally performed on a block by block basis in a raster scan order. The computational overhead or cost is generally evenly distributed over all the blocks during the motion estimation process. In the present invention, motion estimation in the edge blocks (high activity blocks) can be performed first using a cost function that depends on $Y^1(i, j)$, and/or $X^1(i, j)$. This approach allows the emphasis of the features in the image and provide robust, reliable motion estimates in the presence of sensor noise, quantization noise, and illumination changes. An example of a cost function could involve a bit-wise XOR operation on the M-ary levels in the pyramid, which can be implemented as a fast method on certain architectures. The cost function is used to determine the "best match". Let us consider a M-ary valued block at time t (current frame), $Y^1(i, j, t)$ and another M-ary valued block at time t−1 (previous frame) $Y^1(m,n,t-1)$. The cost function is then expressed as:

$$\sum_{\substack{\text{pixels within} \\ \text{the block}}} \text{Number of ones in } \{Y^l(i, j,t) \otimes Y^l(m,n, t-1) \quad (4)$$

where $\otimes$ represents a bitwise XOR operation. This cost function produces substantial computational savings compared to the standard "absolute difference" cost function used on the original 8-bit pixel intensity values. This procedure is performed hierarchically over the M-ary pyramid.

Figure 5:
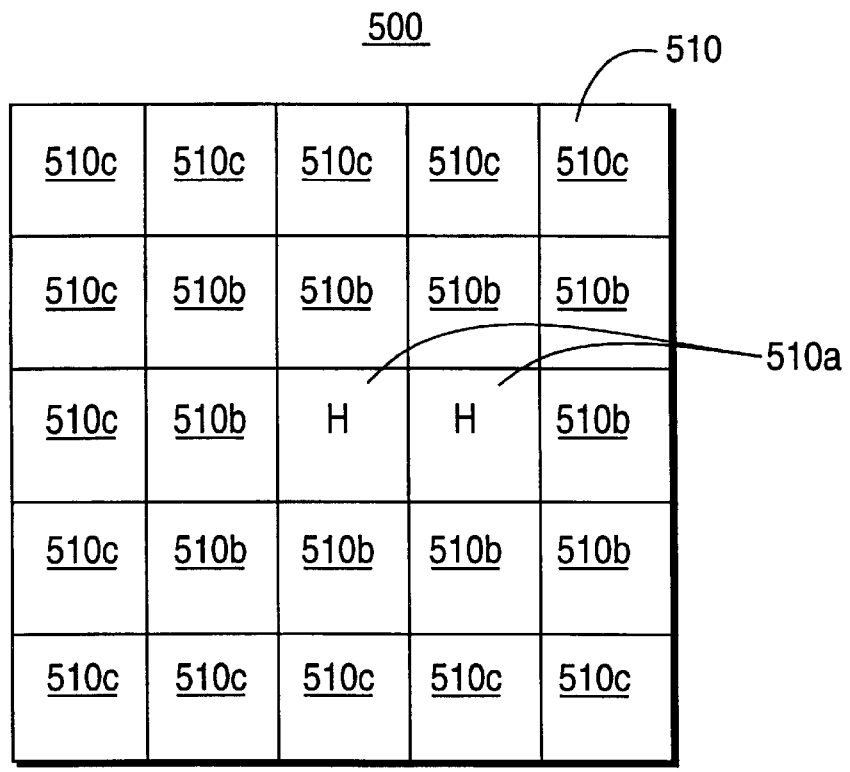
FIG. 5 illustrates an input frame which has been divided and classified into a plurality of blocks.

In other words, the motion estimation method is initiated at the high activity blocks. FIG. 5 illustrates an input frame 500 which has been divided and classified into a plurality of blocks 510. In the preferred embodiment, two blocks 510a have been classified as high activity blocks. As such, motion estimation is performed on these two blocks first. In fact, the computational cost can be increased for these two blocks, since these high activity blocks (high-confidence edge blocks), will most likely provide very high accuracy motion vectors. Thus, more intensive motion estimations are performed in these two blocks than other blocks in the image frame 500, e.g., the high activity blocks can be split to obtain more accurate motion vectors, "half pel" motion estimation can be performed in these two blocks or finer search strategies may be employed.

In turn, after motion estimation is completed for the high activity blocks, the motion estimation will then propagate to the low activity blocks ("Low-confidence" blocks) in the image. However, this propagation is done intelligently depending on the region or object segmentation that is obtained from the classification. This propagation is performed by using the motion of the edge blocks as an initialization for the motion of adjacent blocks, and using a relatively small search-range to refine this initialization. Namely, the motion estimation process propagates (e.g., in a spiraling order) to blocks 510b, where the initial search area is derived from the motion vectors of the high activity blocks. In turn, this propagation strategy is then extended to flat blocks, e.g., blocks 510c and so on, that do not lie adjacent to an edge block, and has the advantage of fast computation since the refinement search-range is relatively small. Furthermore, the motion estimates will be smoother and easier to encode, which is a major advantage in very low bit rate (VLBR) applications where motion information forms a significant portion of the bit-stream. Furthermore, these smoother motion estimates can be expected to perform better in a temporal interpolation application.

Finally, the classification method also produces computational savings when half-pel refinements are used to increase accuracy of motion estimation. The half-pel refinements are performed only on the edge blocks, and not on the relatively flat areas of the image.

Figure 6:
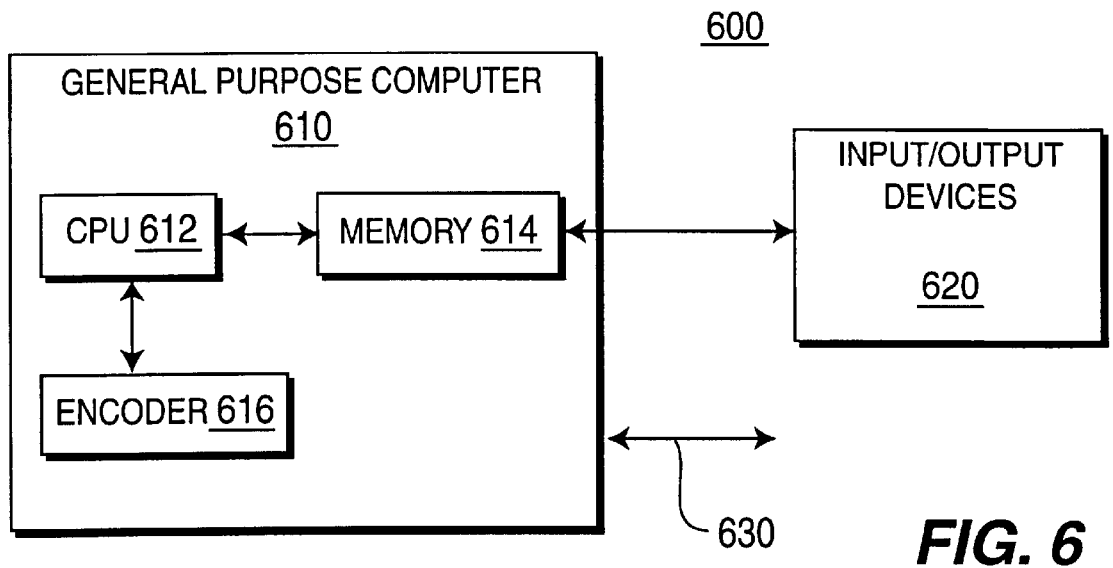
FIG. 6 illustrates an encoding system of the present invention.

FIG. 6 illustrates an encoding system 600 of the present invention. The encoding system comprises a general purpose computer 610 and various input/output devices 620. The general purpose computer comprises a central processing unit (CPU) 612, a memory 614 and an encoder 616 for receiving and encoding a sequence of images.

In the preferred embodiment, the encoder 616 is simply the encoder 100 as discussed above. The encoder 616 can be a physical device which is coupled to the CPU 612 through a communication channel. Alternatively, the encoder 616 can be represented by a software application which is loaded from a storage device, e.g., a magnetic or optical disk, and resides in the memory 612 of the computer. As such, the encoder 100 of the present invention can be stored on a computer readable medium.

The computer 610 can be coupled to a plurality of input and output devices 620, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device. Finally, a communication channel 630 is shown where the encoded signal from the encoding system is forwarded to a decoding system (not shown).

The above described method and apparatus advantageously reduces computational complexity in determining motion vectors for block-based motion estimation, and enhances the accuracy of motion estimation methods. This arrangement provides an impressive increase in computational efficiency over prior art methods for, e.g., predictive encoding of video information. The above-described method and apparatus, and other pixel processing methods and apparatus, may additionally benefit from a method and apparatus for reducing memory resource requirements, such as memory bandwidth requirements. Apparatus and method providing such improved memory resource utilization will now be described.

To achieve such a reduction in memory resource requirements, an embodiment of the invention provide utilizes four main components, namely: 1) the creation of mean and/or M-ary pyramids; 2) the packing and storage in memory of data representative of the created mean and M-ary pyramids; 3) the moving of the packed data into registers for use in arithmetic calculations; and 4) the use of the data for matching error calculations. The four main components will now be discussed.

The first of the four main components comprises the creation of mean and/or M-ary pyramids. Since the previous portion of this disclosure identifies method and apparatus suitable for creating mean and/or M-ary pyramids, such creation will not be discussed in additional detail. However, to properly appreciate the reduction in computational complexity achieved by the invention, it is important to understand the computational load required to create a mean or M-ary pyramid. An illustrative example will now be presented.

Assume that a video stream is decomposed into J+1 levels, with level 0 being the finest and level J being the coarsest. For an MPEG-2 main profile @ main level video stream, a typical value for J would be 3. If P is the number of pixels at level 0, then the number of pixels at level J is $P/4^J$.

For the mean pyramid, at any particular level J except J=0, the computations necessary to produce the values for a particular level comprise three additions and one shift per-pixel. For J=0, the mean pyramid is the original image itself and requires no computations. Thus the total number of operations to generate it is 4/3*P, in the limit where J is large.

For the M-ary pyramid, at any particular level J including J=0, the computations necessary to produce the values for a particular level also comprise three additions and one shift per-pixel. That is, the M-ary pyramid requires computations at all levels from 0 to J−1. Furthermore, for each pixel it is necessary to perform M−1 comparisons. Thus the number of computations is 4/3*P*(M−1) in the limit of large J.

The second of the four main components comprises the packing and storage in memory of data representative of the created mean and M-ary pyramids. The motion estimation scheme utilized by at least one embodiment of the invention relies on the "packing" of, e.g., M-ary data into defined data words in order to achieve computation and memory-bandwidth requirements. That is, data representative of an M-ary pyramid is arranged in a very specific manner such that subsequent storage, retrieval and processing operations may be performed in an efficient manner. This "packing" of the M-ary data is crucial to a fast software implementation of the method of the present invention as used in a general microprocessor or computer architecture.

The exact packing depends on the block-size for motion estimation, on M, the number of states at each pixel, and the register size for the particular architecture. For example, a common pixel block size (i.e., an N1×N2 block where N1 indicates the number of rows and N2 indicates the number of columns) is a 16×16, 16×8 or 8×8 pixel blocks (i.e., N2=16 or N2=8). The number of bits used to represent the M levels is N, and N depends on the exact way in which a distortion is calculated.

Distortion is a measure of the dissimilarity between two pixel blocks. For example, the distortion between a pixel block to be encoded and a reference pixel block may be calculated by performing a logical exclusive OR (XOR) operation between the two blocks. The distortion is equal to the number of "ones" resulting from the XOR operation. If there are no ones (i.e., the distortion is equal to zero) then the pixel blocks are exact matches. If there are many ones, e.g., more than a threshold level, then the pixel blocks do not match. If the number of ones is less then the threshold level, then the pixel blocks are very similar, though not exact matches. When distortion is calculated in this manner, N may be as large as M−1. For M=3, N=2 is typically sufficient.

FIG. 9 illustrates a packed or blocked data representations of pixel information useful in understanding the present invention. Specifically, FIG. 9 shows a plurality of pixel blocks, each pixel block being represented by a plurality of respective words (illustratively four words), each word including information representing a plurality of pixels (illustratively four pixels). The blocks are delineated by vertical demarcations VB1 and VB2 and horizontal demarcations HB1 and HB2. Each "x" represents a single pixel having M states, and each boxed grouping of pixels represents one data word.

FIG. 9 depicts the case where the register size N*N2 is equal to the word size. That is, a 32-bit register size allows representation of an entire line of a 16×16 pixel blocks of a ternary pyramid (M=3, N=2).

However, depending on the number of states for each pixel (M), the number of rows (N1), the number of columns (N2) and the particular pyramid level (J) being processed, the register size N*N2 may be greater than or less than the word-size. If the register size N*N2 is greater than the word-size, it may become necessary to use more than one word to represent the data in a line. If the register size N*N2 is less than the word size, then data may be stored in an overlapped manner with redundant storage, as will now be described with respect to FIG. 10.

Figures 10, 11:
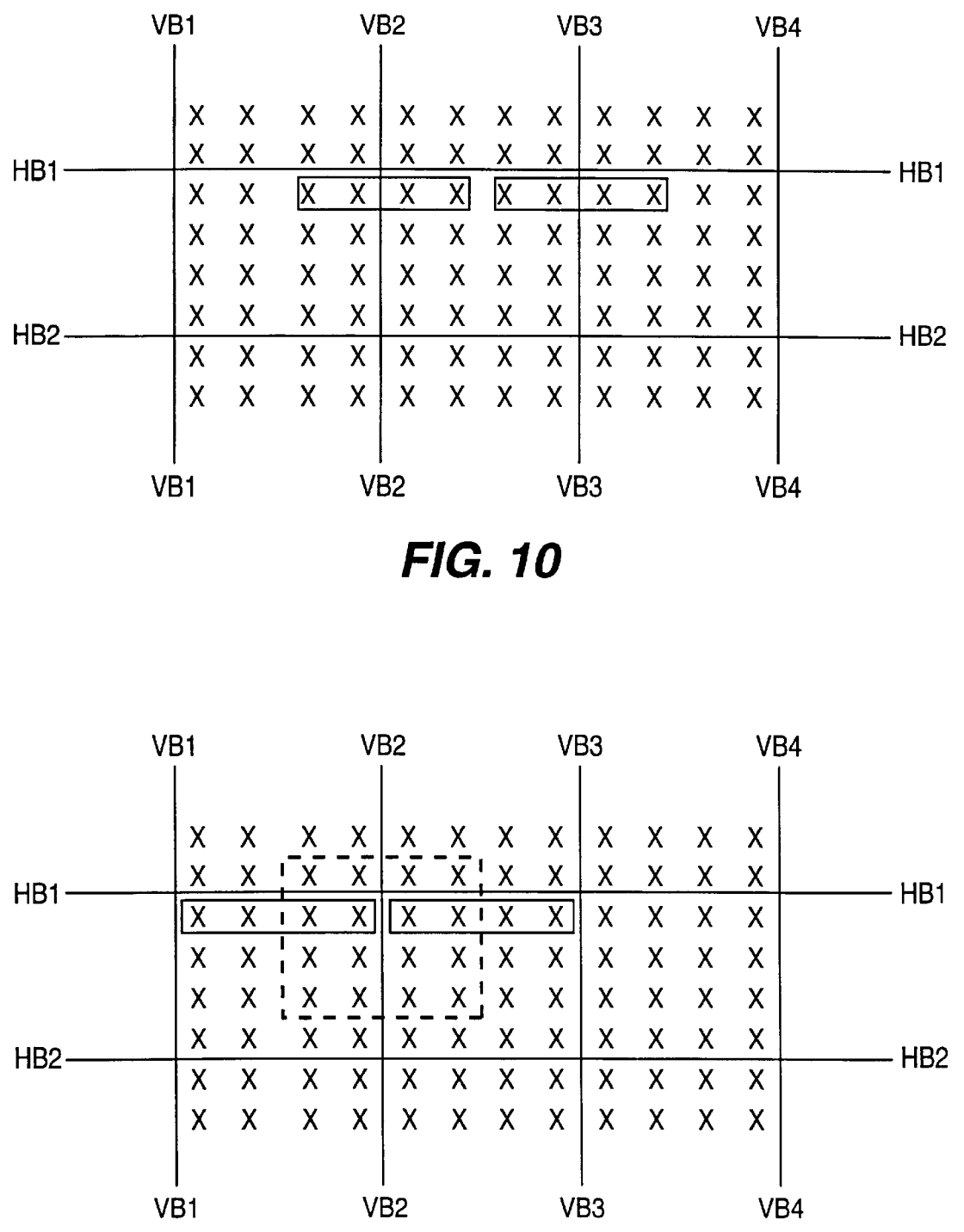

FIG. 10 illustrates a packed or blocked data representations of pixel information useful in understanding the present invention. Specifically, FIG. 10 shows a plurality of pixel blocks, each pixel block being represented by a plurality of respective words (illustratively four words), each word including information representing a plurality of pixels (illustratively four pixels). The blocks are delineated by vertical demarcations VB1–VB4 and horizontal demarcations HB1 and HB2. Each "x" represents a single pixel having M states, and each boxed grouping of pixels represents one data word.

FIG. 10 depicts the case where the register size N*N2 is less than the word size, such that data is stored in an overlapped manner with redundant storage. Note that the two four-pixel blocks include pixels from each side of a vertical demarcation line. Thus, each word contains data from its block and from the two horizontally adjacent blocks. In a hierarchical motion estimation scheme with small search ranges at the finer levels, this method will keep the number of loads to a very small number, thereby reducing memory bandwidth. If there is no overlapping, then it is necessary to load in additional words corresponding to the adjacent horizontal blocks when the block in the reference frame does not correspond to the horizontal block boundaries.

The process of packing requires two ALU operations for every pixel, a shift operation and a logical OR operation. Thus, in the case of non-overlapping packing (per FIG. 9), the number of operations per is 8/3P. In the case of overlapping packing (per FIG. 10) additional shift and OR operations are necessary.

The third of the four main components comprises the moving of the packed data into registers for use in arithmetic calculations. Specifically, the third of the four main components implicates memory bandwidth issues, namely the speed at which data may be moved in and out of registers, and the number of times such movements must occur.

FIG. 8 depicts a portion of a computing device useful in understanding the invention, and particularly the memory bandwidth issue. Specifically, FIG. 8 depicts a portion of a general microprocessor or computer architecture comprising a memory module 810, a cache memory module 820, a data bus 830, a general purpose register file 840 and an arithmetic and logic unit (ALU) 850. The general purpose register file may be considered as a comprising a plurality of register groups.

Packed data representative of, e.g., an M-ary pyramid is stored in the memory module 810. To process the data in, e.g., a motion estimation process, it is first necessary to move the data to the general purpose register file 840. This is accomplished by retrieving a desired data word from the cache memory module 820 or, if necessary, directly from the memory module 810. The data is coupled from the memory module 810 to the cache memory module 820 via a signal path S1, and from the cache memory module 820 to general purpose register file 840 via the data bus 830. The data is then stored in one of a plurality of registers or register groups within the general purpose register file 840.

To perform a mathematical or logical operation on the data, the data is coupled to the ALU 850 via a first signal path S2 (or S3). If the mathematical or logical operation to be performed by the ALU 850 requires a second operand, then the second operand is coupled to the ALU 850 via a second signal path S3 (or S2). The output of the ALU 850 is then stored in a register within the general purpose register file 840. The stored output may then be stored in memory 810 via memory cache 820, thereby utilizing the data bus 830 and the signal path S1.

If the data word representing a pixel is larger than the size of the registers in general purpose register file 840 or the arithmetic or logical processing elements of the ALU 850, the data word will be processed incrementally. That is, the data word will be processed as a series of sub-words of appropriate size until the entire data word has been processed. Thus, by constraining the representation of pixel information to a data word appropriate to the general purpose register file 840 or the arithmetic or logical processing elements of the ALU 850, there data word may be processed using a single operation, rather than a series of sub-operations.

In order to perform the error calculations which will be described below with respect to the fourth of the four main components, it is necessary to get the pixel representative data into the various registers for processing. Briefly, the error calculations are used to find matches in intensity levels of pixels to help identify motion of a pixel block within a picture over time (e.g., within successive image frames).

If the intensity level of each pixel in a pixel block of an original image is represented by 8 bits, and the register size is equal to 32 bits, then it is only possible to load a small fraction of the pixel block into a register at one time. Thus, when matching intensity levels of pixels in an original image (i.e., J=0), many retrieve, process and store operations must be performed to compare two pixels. However, with M-ary matching most (or all) of the intensity level data associated with a pixel block may be loaded at one time, thereby providing a substantial savings in the memory-bandwidth requirements. In many cases, the current (original) image can be loaded into the registers at the beginning of motion estimation and they always remain there throughout the search for that particular block.

A search for matching pixel blocks using the packed data representation of the invention will now be described. The search comprises the comparison of pixels intensity levels of pixels within a current pixel block to similarly sized blocks of pixels in the selected search area of, e.g., the preceding frame. Thus, it is necessary to load a current pixel block of a reference frame being processed into, e.g., the register file 840. By utilizing the packing methods described herein, the M-ary values corresponding to many pixels within a line may be stored in one word. For example, in the {M=3,N=2,N2=16} case, it is necessary to load sixteen 32-bit words into the registers of, e.g., register file 840.

For purposes of this discussion it will be assumed that the search range comprises a vertical search range of –K1 to K1 and a horizontal search range of –K2 to K2, where K1 represents the vertical direction, 2K1+1 represents the number of rows, K2 represents the horizontal direction and 2K2+1 represents the number of columns.

The first step is to load the zero search vector data into the registers. The zero search vector data may comprise a zero refinement based on a previous estimate (e.g., from a coarser pyramid level). If the zero search vector aligns with block boundaries, or if the overlapped storage is sufficient to cover the misalignment with the boundaries then only the words corresponding to the block need be loaded. Otherwise, it is necessary to load more than one set of words, and perform shift, masking and logical OR operations on the loaded word sets to properly align the data within the registers.

The error between the current block and a presently identified search block is then computed. If a match is found, then a motion vector associated with the current block is determined. The next pixel block in the reference frame is selected as the current block, and the search process is repeated for the "new" current pixel block.

If a match is not found, then the search is moved in the horizontal direction. That is, the search window is shifted horizontally by, e.g., one pixel. Again, the number of loads depends on whether or not the horizontal reference block lies along the block boundaries. The step of computing an error between the current block and a presently identified search block to identify a match is then repeated. These steps are repeated until the horizontal search range has been examined.

If the horizontal search range is examined without finding a match to the current block, then the search window is shifted vertically by one line, and the entire horizontal search range (–K2 to K2) is again examined (until a match is found). This process is repeated at every vertical position in the search range (2K1+1 positions). This is the case where there is no overlapping.

To illustrate the computational complexity required to perform the above-described search, the previous example of 16×16 pixel blocks, ternary pyramids (M=3, 2 bits/pixel), and an assumption that the zero search position falls along the block boundaries, will be examined within the context of the search.

Specifically, the 16 words corresponding to the zero search position in the previous frame are loaded into the register file 840. Then, the error can be computed between these 16 words and the 16 words corresponding to the previous frame.

Next, the search is moved in the horizontal direction. In this case, N bits from the current word are shifted out of the registers and a new word corresponding to the next block is loaded. The correct N-bits are extracted from that next block and logically OR-ed to properly align the data in the registers. This has to be done for all 16 lines in the block. Therefore, for each line there are one load operation, two shift operation, one mask operation and one logical OR-ed operation. These operations are performed for all sixteen lines in the block. The search is repeated for all the row positions [1,K2]. After this, the 16 words corresponding to a zero horizontal displacement are loaded, and the above procedure is repeated for positions [–1 through –K2].

The total number of computations for the horizontal positions [1,K2] and [–K2,–1] comprises 16 initial loads for the zero horizontal position words; 16K2 loads and 64 K2 operations for the horizontal positions [1,K2]; 16 loads to load back the zero horizontal position words; and 16K2 loads and 64 K2 operations for the horizontal positions [–K2,1].

The total number of computations for the vertical positions=(32K2+32) loads+(128K2) operations. The entire procedure is repeated for each vertical position (2K1+1 positions). Thus, the total number of computations required to the data into the right place is (2K1+1)(32K2+32 loads) and (2K1+1)(128K2 operations). This is a significant number of loads and arithmetic or logical operations. By utilizing the M-ary pyramid decomposition of images to produce a reduced amount of pixel data, and by packing and storing that pixel data in the manner previously described, a significant savings in memory bandwidth is realized, along with a reduction in computational loading of a processing element.

The fourth of the four main components comprises the use of the data for matching error calculations. For example, to determine if a current block (ci) matches, (i.e., is the same as, or similar to) a previous or reference block (pi) the two blocks may be exclusive OR-ed (XOR-ed) to produce a result. The number of ones in the result is the number of mismatches between the two words. The current block (ci) is said to match the previous or reference block (pi) if the number of mismatches is zero (i.e. the result is all zeros), or below some threshold level. When performing a search, this error calculation is repetitively performed until a previous or reference block (pi) matching the current block (ci) is found.

By utilizing the above-described packing and storing method, the processing and memory bandwidth required to implement the error matching calculations is greatly reduced. Moreover, if the data is packed and stored in an overlapped manner, then any mismatches (i.e., ones) within the error calculation result that are not attributable to the previous or reference block (pi) being examined are ignored.

To more clearly illustrate the operation of the invention, a method of packing and storing pixel blocks forming an M-ary pyramid level will be discussed below with respect to FIG. 12. Similarly, a method of computing error measurements between the packed and stored pixel blocks (i.e., reference pixel blocks) and a current pixel block will be discussed below with respect to FIG. 13.

FIG. 11 illustrates a packed or blocked data representations of pixel information useful in understanding the present invention. Specifically, FIG. 11 shows a plurality of pixel blocks, each pixel block being represented by a plurality of respective words (illustratively four words), each word including information representing a plurality of pixels (illustratively four pixels). The blocks are delineated by vertical demarcations VB1–VB4 and horizontal demarcations HB1 and HB2. Each "x" represents a single pixel having M states, and each boxed grouping of pixels represents one data word.

FIG. 11 shows a current block ci, denoted by a dashed line, that includes information from two words, denoted by non-dashed lines, to provide a single line of the pixel block. Therefore, an error calculation using the entirety of each of the two words for each line may be performed in the above-described manner, but the portion of the result word attributable to data outside of the current block ci is simply ignored in determining if a match has been found. This needs to be done for all the words in each block line and the results accumulated.

In one embodiment of the invention the ones in the XOR result are counted by using a table lookup on, e.g., a table of size 256. In this embodiment, the appropriate bits within the register holding the XOR result are split into bytes, a table lookup is performed and the accumulated XOR results are added to produce a final error figure.

The computational load to produce this final error figure will now be discussed using the ternary pyramid example. For each line in a block, a single XOR operation must be performed; each 32-bit XOR result must be unpacked into four 8-bit bytes; a table lookup must be performed for each of the bytes; and the total number of ones must be accumulated. This corresponds to one XOR operation, three shift operations, three masking operations, four table lookups (which is assumed to be equivalent to 4 load operations) and four add operations to accumulate the four XOR results. These are the operations per block line. Thus, for one error calculation, 176 arithmetic operations or logical operations and 64 lookup operations are required. Since there are $(2K1+1)*(2K2+1)$ possible error calculations to be performed, the total number of loads and operations that are needed for the error calculation is $(2K1+1)*(352K2+176)$ arithmetic or logic operations and $(2K1+1)*(128K2+64)$ load operations. Thus, the total number of computations for ternary matching is $(2N+1)\{470K2+160\}$ arithmetic or logical operations and $(2K1+1)\{160K2+96\}$ load operations.

An important application of the invention will now be discussed within the context of mean matching. Specifically, at each level of a pyramid it may be desirable to additionally use data from the mean pyramid in the matching criteria. That is, a current mean pyramid block is compared to a previous or reference mean pyramid block to determine if a match exists.

As previously discussed, an M-ary pyramid is built from a mean pyramid. Thus, the mean pyramid is available for the current level (i.e., the mean pyramid may be stored during construction of the M-ary pyramids and retrieved as necessary). It is also assumed that the mean value is available for each block which lies within the block boundaries, since this information can be obtained from the coarsest level in the mean pyramid.

When using the mean pyramid information as part of the matching criteria, for each shift operation it is necessary to recalculate the mean for the shifted reference block. For horizontal shifts, this is equivalent to 2N1 loads, N1 subtractions, N1 additions, and in the horizontal direction, requires 2N2 loads, N2 additions and N2 subtractions. Also, the mean matching typically requires one subtraction operation and one addition operation to combine the error in the mean with XOR error.

To perform the mean matching operation with the ternary pyramid example, 16 words are loaded into the registers and subtracted from the mean, 16 new words are then loaded into the registers and added to the mean. It must be noted that if the mean pyramid is stored in an overlapping packed manner (discussed above with respect to FIG. 10), there may be additional required operations to perform multiply or divide operations (which may be performed using shift operations). Thus, each mean calculation requires 32 loads operations and 34 arithmetic or logic operations. The total number of calculations for the one mean matching is 36, plus the number of operations for any multiply and divide operations (illustratively four). The total mean-matching for a block "costs" $(2K1+1)*(2K2+1)*32$ load operations and $(2K1+1)*(2K2+1)*40$ arithmetic and logical operations.

The total number of computations at this level for matching one block using the ternary-plus-mean matching method is $(2K1+1)\{560K2+200\}$ arithmetic or logic operations and $(2K1+1)\{224K2+128\}$ load operations.

It is useful to contrast the above example to the "regular" block matching method of measuring distortion known as the sum-of-absolute differences (SAD) method. Specifically, let the absolute values be computed using a lookup table (it should be noted that the SAD lookup table is twice the size of a corresponding XOR lookup table, i.e., 512 versus 256 bytes). Without packing, it is necessary to perform 512 load operations for each search vector (since both the current block as well as the previous block must be loaded for each SAD operation), 512 arithmetic operations (one addition and one subtraction per pixel) and 256 lookup operation for the SAD. Thus, the computational loading for full search block matching using the SAD technique is $(2K1+1)\{1024K2+512\}$ arithmetic or logical operations and $(2K1+1)\{1536K2+768\}$ load operations.

Thus, in terms of operations per block, the use of data packing according to the invention and ternary-plus-mean matching instead of the normal intensity based matching technique results in a factor of 6.5 reduction in memory bandwidth requirements (depending on K2), and factor of 2 reduction in computational loading. The reduction in memory bandwidth requirements is calculated using the ratio of load operations of: $(2K1+1)(1536K2+768)\}/\{(2K1+1)(224K2+128)\}$. Similar the reduction in computational loading is calculated using the ratio of arithmetic or logic operations of: $\{(2K1+1)(1024K2+512)\}/\{(2K1+1)(560K2+200)\}$. These ratios hold true for any level in the hierarchy where ternary-plus-mean matching is used instead of the normal intensity based matching. It must be noted that the ratios ignore the initial cost of building the pyramids, and only consider the moving the data into the appropriate position within the registers and performing the matching calculations on the data.

Since direct application of full search block matching is highly inefficient, it is useful to consider a hierarchical scheme to speed up the method of the invention. In a general hierarchical scheme, an initial level pyramid is built from the image. Each coarser pyramid level is a filtered, sub-sampled version of the preceding (in terms of coarseness) image pyramid. Motion is first estimated at the coarser level of the pyramid (where the range is much lower than the range at the finest, original resolution) and then propagated to the finer levels where the search is refined over a small window. Since the range is quite small at the finer resolutions (where there are more pixels and the matching error computation needs more calculations) a substantial reduction in the number of computations over full-search block matching at the finest level is realized.

By replacing some (or all) of the levels with M-ary matching instead of intensity based matching, the computational loading at a particular level is decreased by a factor of two, and the memory bandwidth requirement is decreased by a factor of 6 or 7. This easily offsets the extra computations required for the M-ary pyramid calculation, and provides a substantial reduction in the number of computations and memory bandwidth. Note also that the M-ary pyramid are also useful for other purposes, such as image pre-processing and block classification (e.g., as described above), and that the extra computational resources may be utilized, e.g., in another module within a video coder employing the invention.

The invention has been described within the context of a motion estimation scheme based on feature vectors obtained from M-ary pyramids. This motion estimation scheme is faster and requires less memory bandwidth than similar hierarchical motion estimation schemes. The invention has been particularly described within the context of an exemplary ternary pyramid (M=3) application in order to better illustrate computational and memory-bandwidth advantages of the invention. Similar advantages may be realized using other values of M, using other block sizes and the like. One skilled in the art and informed by the present disclosure will be able to readily adapt the teachings of the invention to other permutations that are within the scope of the appended claims below.

Figure 12:
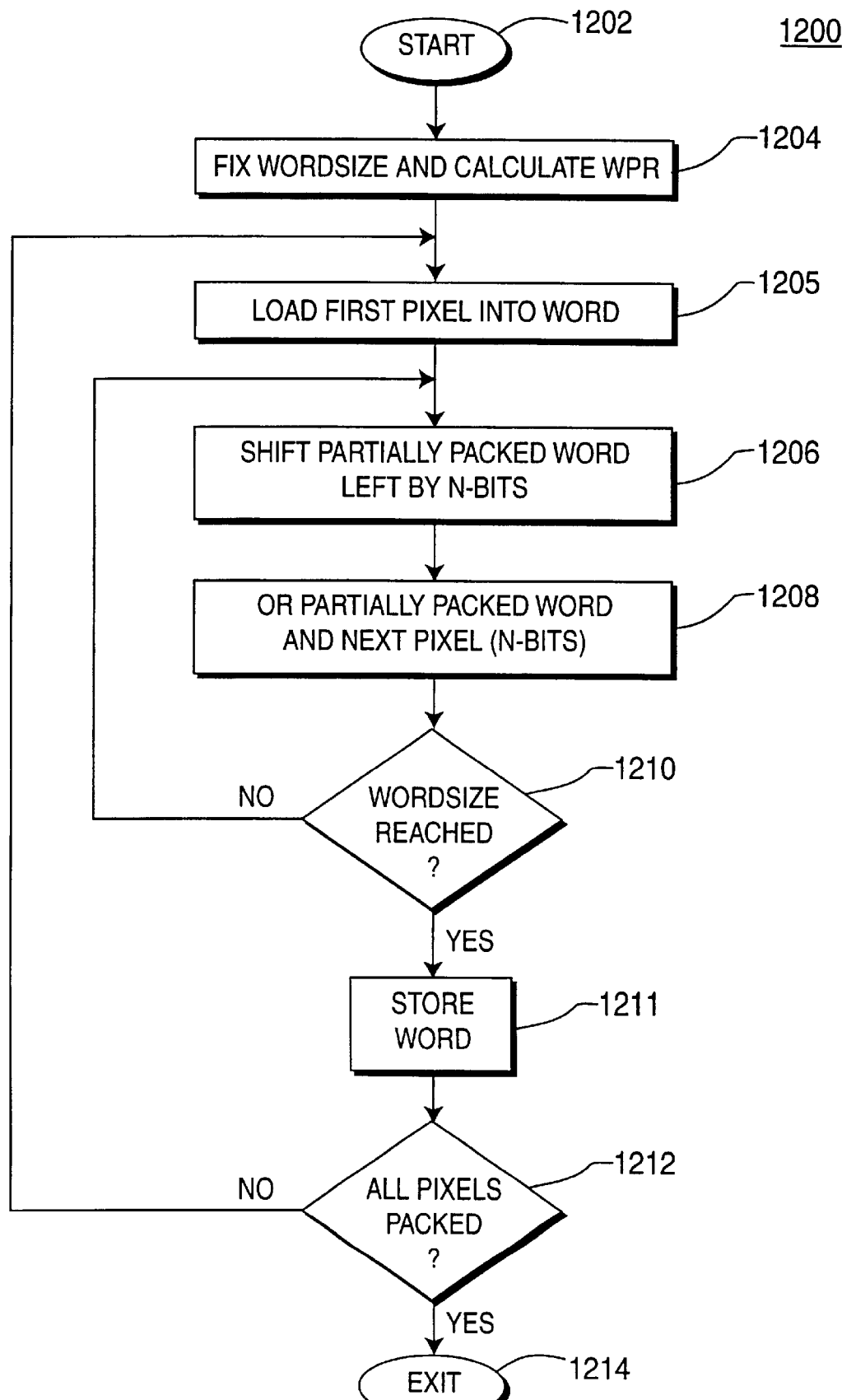
FIG. 12 illustrates a flowchart of a method of packing and storing pixel blocks according to the present invention.

FIG. 12 illustrates a flowchart of a method of packing and storing pixel blocks according to the present invention. Specifically, the method 1200 depicts a method of forming a plurality of data structures, where each of the plurality of data structure comprises pixel data related to at least two pixels. The packed data structures are then stored in a manner that facilitates subsequent processing. For example (as described above) four 8-bit pixel may be stored in a single 32-bit data structure, and eight 32-bit data structures may be used to store a single pixel block. In this manner, subsequent block-level processing may be performed efficiently by utilizing the packed data structures. The method 1200 will be described within the context of packing and storing pixel blocks forming a pyramid level of an image having the following parameters:

$M_j$ is an M-ary pyramid of level J;
WIDTH is the width of the M-ary pyramid;
HEIGHT is the height of the M-ary pyramid;
BLK_WIDTH is the width of a pixel block within the M-ary pyramid;
N is the number of bits per pixel;
N_OVERLAP_L is he number of pixels to overlap on the left side of a block while packing;
N_OVERLAP_R is he number of pixels to overlap on the right side of a block while packing;
WORDSIZE is the size of the data type (in bits) into which the block is to be packed;
N_UNUSED_BITS is the number of unused bits in a packed data representation of a data type having a size of WORDSIZE; and
WPR is the number of words per row of a block, and is calculated according to equation (5) as follows:

$$WPR = \frac{N(\text{BLK\_WIDTH} + \text{N\_OVERLAP\_L} + \text{N\_OVERLAP\_R}) + \text{N\_UNUSED\_BITS})}{\text{WORDSIZE}}$$

It must be noted that WORDSIZE is chosen or fixed prior to packing the various data. Additionally, it may be determined that the packed data will not occupy every possible bit position in the word to be packed (e.g., packing three 8-bit pixel representations into a 32-bit word). Thus, WPR is modified by the number of unused bits in a word.

The 1200 of FIG. 12 is entered at step 1202 and proceeds to step 1204. At step 1204, WORDSIZE is fixed and WPR is calculated according to equation 5. The routine 1200 then proceeds to step 1205.

At step 1205, data associated with a first pixel is loaded into the packed word (i.e., data structure) being formed. For example, assuming that N=8 and WORDSIZE=32, an 8-bit representation of a pixel is loaded into the lower 8-bits of a 32-bit word to form a partially packed word. The routine 1200 then proceeds to step 1206.

At step 1206 the partially packed word is shifted left by N bits, where N is the number of bits per pixel in the presently processed pyramid level. The routine 1200 then proceeds to step 1208.

At step 1208 the partially packed word is logically OR-ed with the next N-bit pixel to be packed (e.g., the next 8-bit pixel). The routine 1200 then proceeds to step 1210.

At step 1210 a query is made as to whether the WORDSIZE has been reached. That is, a query is made as to whether the number of logical OR operations and subsequent shift operations has produced a packed word having the number of bits corresponding to the WORDSIZE.

If the query at step 1210 is answered negatively, then the routine 1200 proceeds to step 1206. If the query at 1210 is answered affirmatively, then the routine 1200 proceeds to step 1211, where the packed word is stored in memory. The routine 1200 then proceeds to step 1212.

At step 1212 a query is made as to whether all of the pixels have been packed. That is, a query is made as to whether all the pixels in, e.g., an original image or reduced resolution image (i.e., a low-pass filtered and sub-sampled image pyramid) have been packed and If the query at step 1212 is answered negatively, then the routine proceeds to step 1205, where the first pixel of the next word to be packed is loaded.

The above packing routine 1200 operates to pack pixel data associated with, e.g., an original image, an M-ary pyramid or a mean pyramid into a plurality of defined data structures. These defined data structures advantageously provide a compact means of storing and processing the pixel data, as will be described below with respect to FIG. 13.

One important data structure formed using the method 1200 of FIG. 12 comprises a packed frame, where each word within the packed frame comprises one of a multiple row, entire row or partial row of M-ary pixels within a pixel block. Each word within the packed frame also comprises additional pixels from corresponding rows of horizontal pixel block neighbors for overlapped packing.

It is important to note that in a redundant storage embodiment of the invention, each data word includes pixel information that is also included in another data word. That is, a first data word includes pixel information for a first plurality of horizontally disposed pixels, a second first data word includes pixel information for a second plurality of horizontally disposed pixels, and the first and second pluralities of horizontally disposed pixels includes common (i.e., shared) pixel information.

Similarly, in an overlapping storage embodiment of the invention, each data word includes pixel information from adjoining rows of at least two pixel blocks. That is, a data word includes pixel information from a row of a first pixel block and an adjoining row of one more adjoining pixel blocks.

Figure 13:
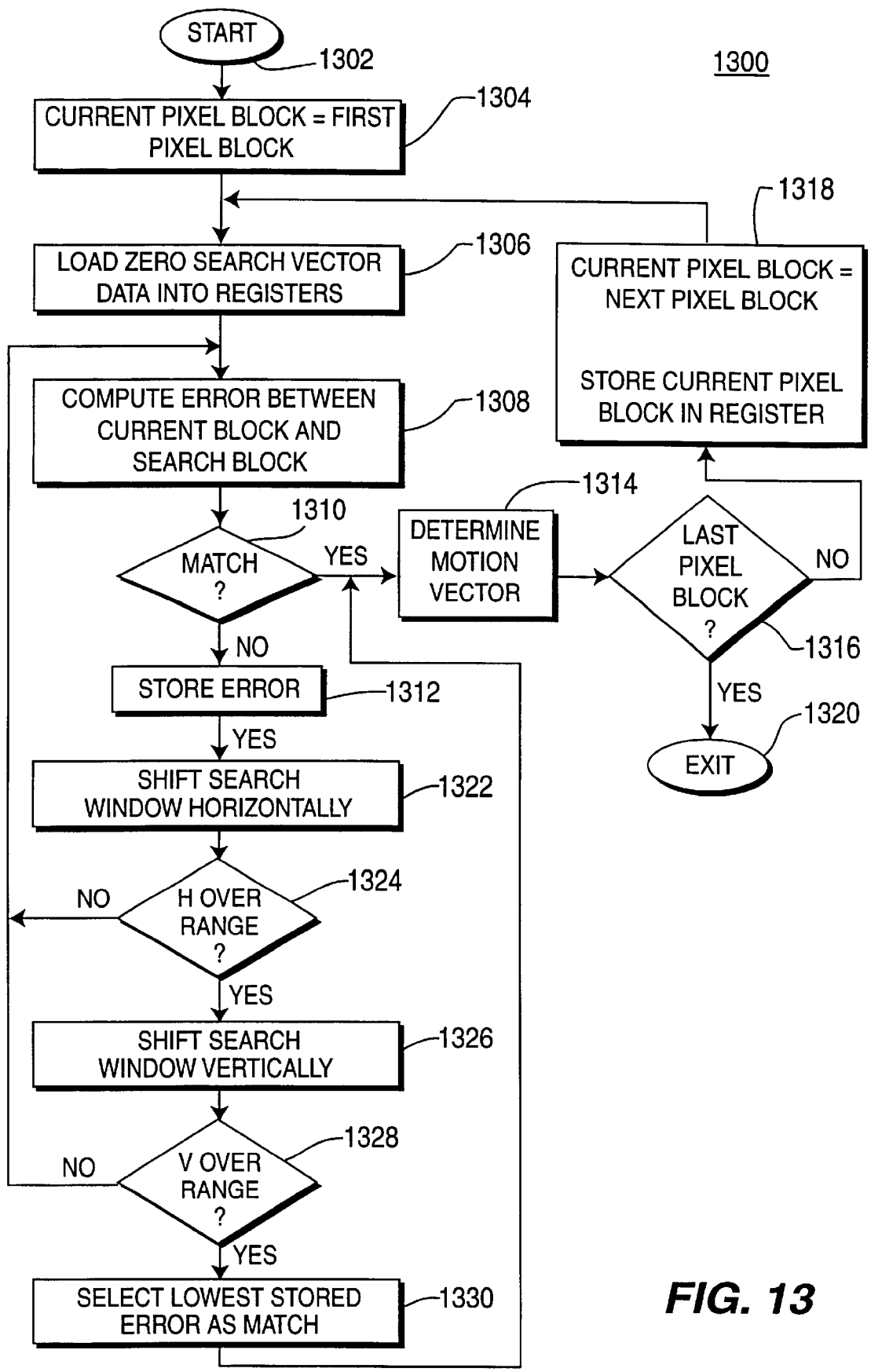
FIG. 13 illustrates a flowchart of a method of searching for a pixel block match according to the present invention.

Advantageously, as in the case of the method 1300 of FIG. 13, the additional pixels from corresponding rows may be loaded into a register along with the multiple row, entire row or partial row of M-ary pixels within the pixel block. In this manner, the loaded multiple row, entire row or partial row of M-ary pixels within the pixel block may be processed rapidly using XOR and shift operations for horizontal searching, rather than only XOR and load operations.

FIG. 13 illustrates a flowchart of a method of searching for a pixel block match according to the present invention. Specifically, FIG. 13 depicts a search method suitable for use in, e.g., a block-based encoder providing, for each prediction-mode encoded block, a motion vector and residual or error information. It is important to the efficiency of such an encoder to provide a motion vector pointing to a pixel identical to, or at least similar to, the pixel block being predicted, so that the residual or error information is reduced as much as possible. Thus, the search method of FIG. 13 is advantageously used to identify, for each pixel block in an image or image pyramid, a matching (or similar) pixel block in the reference image or image pyramid.

The method 1300 compares a current pixel block (e.g., a pixel block to be predicted) to pixel information within a stored image or image pyramid that has been processed and stored in, e.g., the manner described above with respect to FIG. 12.

The method 1300 of FIG. 13 may be advantageously employed using either an packed domain reference image or packed domain reference image pyramid. For example, by comparing a low pass filtered and sub-sampled version of the current pixel block to an image pyramid of approximately the same coarseness (e.g., current pixel block and reference image pyramid of J=3 coarseness), the processing time necessary to find a match (or lack of match) for each current pixel block may be reduced.

The method of FIG. 13 is entered at step 1302 and proceeds to step 1304 where a current pixel block is set equal to a first pixel block of, e.g., an image frame to be predictively encoded (or an associated image pyramid). Since the current pixel block will be compared to packed domain pixel blocks forming a reference image or image pyramid, the first pixel block is formatted (if necessary) according to the particular packed domain representation used for the reference image or image pyramid and stored in a register (or registers) as the current pixel block. The method 1300 then proceeds to step 1306.

At step 1306 zero search vector data is loaded into one or more registers. That is, the packed data domain reference word (or reference block) including left and right overlapping data sufficient for a particular search range is loaded into one or more registers. By loading the overlapping packed data in addition to the packed data of the reference word (or block), matching operations may be performed within a limited range without additional load operations. In the case of a zero search vector being formed using multiple words, the zero search vector may be extracted from the multiple words and formatted (if necessary) according to the particular packed domain representation used for the reference image or image pyramid. The zero search vector data may comprise, e.g., a refinement made using a previous (i.e., coarser) pyramid or the zero search vector data may simply comprise the upper left portion of a region to be searched. The method 1300 then proceeds to step 1308.

At step 1308 an error between the current block and a search identified by the search vector data is computed. For example, a current pixel block is XOR-ed with the pixel block positionally identified by the search vector data to determine the distortion (i.e., difference) between the two pixel blocks. The distortion, as previously described, comprises a sum of the differences (SAD) between the two pixel blocks. In the case of a logical XOR comparison, the SAD comprises a count of the number of binary ones, where each one represents a bit or pixel of the current pixel block that does not match a corresponding bit or pixel of the reference pixel block. The magnitude of the distortion is indicative of the matching (a perfect match is a distortion of zero) or lack of matching between the two pixel blocks. The method 1300 then proceeds to step 1310.

At step 1310 a query is made as to whether the computation of step 1308 produced a match. That is, at step 1310 a query is made as to whether the number of binary ones produced by the exclusive or logical operation of the two pixel blocks is below a threshold level indicative of a match or a near-match. If the query at step 1310 is answered affirmatively, then the method 1300 proceeds to step 1314. If the query at step 1310 is answered negatively, then the method 1300 proceeds to step 1312.

At step 1314 a motion vector is determined. That is, a motion vector that relates the current pixel block to the pixel block matching the current pixel block is determined. During a subsequent encoding step in, e.g., a video encoder, the current pixel block will be encoded as a motion vector (pointing at the matching reference block) and a residual (the encoded difference between the current pixel block and matching pixel block). The method 1300 then proceeds to step 1316.

At step 1316 a query is made as to whether the current pixel block is the last pixel block of a current image or image pyramid. If the query at step 1316 is answered affirmatively, then the method 1300 proceeds to step 1320 where it is exited. If the query at step 1316 is answered negatively, then the method 1300 proceeds to step 1318.

At step 1318 the pixel block identified as the current pixel block is set equal to the next pixel block within the image frame to be predictively encoded. The next pixel block is then stored in a register (or registers) as the current pixel block. The method 1300 then proceeds to step 1306, where the process is repeated.

At step 1312 the error computed at step 1308 between the current pixel block and the pixel block of the reference frame identified by the search vector data is stored. Specifically, in the case of an error level or distortion determined by a number of ones resulting from a logical exclusive OR (XOR) operation, a number indicative of the number of ones (i.e., a sum of the number of ones) is stored and associated with that reference pixel block. The method 1300 then proceeds to step 1322.

At step 1322 the search window is horizontally shifted. That is, the search window is horizontally shifted to the left or right by, e.g., one pixel. In one embodiment of the invention the initial zero search vector data at step 1306 to describe a window at upper left of a reference frame. In this embodiment the search window is horizontally shifted from left to right over the entire range of the reference frame. Upon reaching the end of the reference frame the window is vertically shifted downward by one line and further horizontal shifts are from right to left by one pixel. The method 1300 then proceeds to step 1324.

It is important to note that the shifting of the search window within a predefined range is accomplished without loading additional data. This is because the reference pixel block (or portion thereof) loaded into the register file includes some or all of the left and right overlap portions of the packed domain data. Thus, the shifting operation realigns the loaded reference pixel block row (or rows) to the current pixel block row (or rows). For example, if a horizontal search range of ±2 pixels is used for a 16-bit row of pixels, and a 20-bit word is loaded into the register(s) at step 1306, five shift and compare operations may be performed without reloading the registers. This represents a substantial savings in terms of memory resource utilization. In the case of the pre-defined range of overlap being exceeded, it is necessary to format (using shift and logical OR operations) the various words loaded into the registers.

At step 1324 a query is made as to whether a horizontal over-range condition exists. That is, a query is made as to whether the horizontal shift of the search window at step 1324 has exceeded the bounds of the reference frame being searched (e.g., the five shift and compare operations have been performed). Optionally, where an overlapping storage technique is used, the query at 1324 indicates whether that over range portion (e.g., either right over-range or left over-range) has been exceeded by the shift operation. If the query at step 1324 is answered negatively, then the method 1300 proceeds to step 1308. If the query at step 1324 is answered affirmatively, then the method 1300 proceeds to step 1326.

At step 1326 the search window is vertically shifted by, e.g., one line. In one embodiment of the invention the search window, after being shifted to the right until a horizontal over-range condition exists, is shifted downward by one line. Thereafter, horizontal shifts of the search window proceed from right to left until the left boundary is traversed, as noted by the query at step 1324. The method 1300 then proceeds to step 1328. At step 1328 a query is made as to whether a vertical over-range condition exists. That is, a query is made as to whether the vertical shift has exceeded the reference frame being examined. If the query at step 1328 is answered negatively, then the method 1300 proceeds to step 1308. If the query at step 1328 is answered affirmatively, then the method 1300 proceeds to step 1330.

At step 1330, the lowest stored error is selected as a match for the current pixel block. That is, at step 1330 all of the possible matches for the current pixel block have been examined and the errors of each examination have been stored at step 1312. The lowest error is selected at step 1330 such that the current pixel block is associated with the pixel block having the lowest difference for error. In the case of a standard video encoder, if this lowest error exceeds a threshold level, the video encoder may choose to intra-code the current pixel block. Similarly, if the error is less than the second threshold level, the video encoder may choose to inter-code the current pixel block, and associate the inter-coded pixel block with a motion vector and residual error. The method 1300 then proceeds to step 1314.

The method 1300 described above with respect to FIG. 13 matches pixel blocks by using distortion calculations on a pixel block by pixel block basis. That is, two pixel blocks to be compared are loaded into respective register files in their entireties. XOR operations of the respective register files are performed for each of a plurality of horizontal positions (i.e., the current pixel block is shifted through multiple horizontal positions with respect to the reference pixel block (including any overlap). This method work very well, though it necessarily requires a sufficient number of registers to hold the pixel blocks. A method suitable for use in a register constrained processing environment will now be described with respect to FIG. 14.

Figure 14:
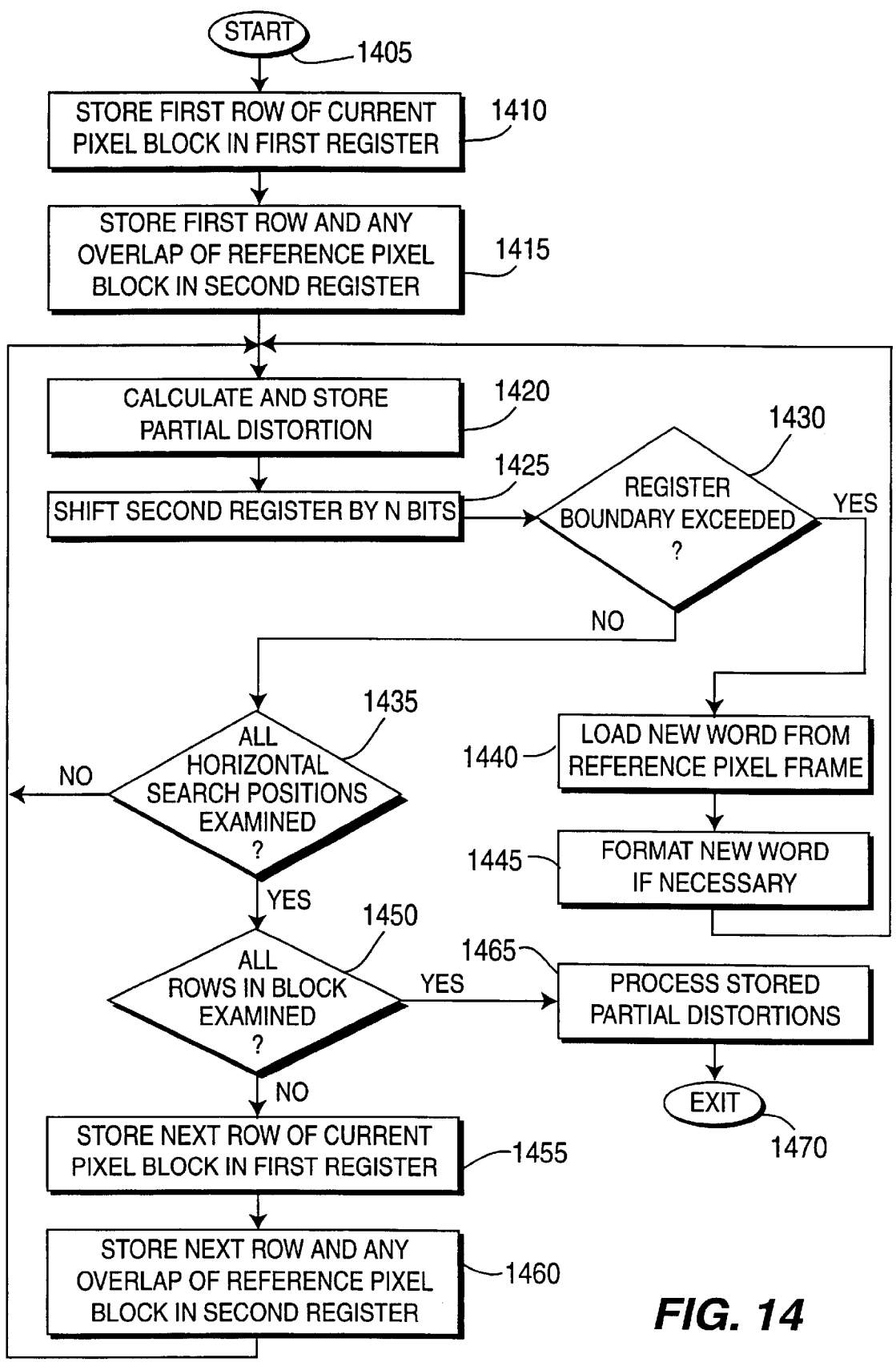
FIG. 14 depicts a method for computing an error between a current block and a search block using partial distortion measurements.

FIG. 14 depicts a method for computing an error between a current block and a search block using partial distortion measurements. Specifically, FIG. 14 depicts row by row (rather than pixel block by pixel block) method 1400 of generating partial distortion values (rather than full distortion values). The teachings of the partial distortion method 1400 of FIG. 14 may be readily applied to the more general case described above with respect to FIG. 13.

The method 1400 of FIG. 14 compares each row of N pixels within a current pixel block to multiple N-pixel portions of an entire corresponding row of pixels within a reference pixel frame by performing repeated compare and shift functions. That is, a current pixel block row is successively compared to portions of a corresponding row of pixels within the reference pixel frame. After each row of the current pixel block is compared to a respective corresponding row within the reference pixel frame, the correspondence between the current pixel block rows and the reference pixel block rows block is vertically shifted and the process is repeated.

For example, in an embodiment of the invention utilizing eight row pixel blocks, the eight rows of a current pixel block are compared to a corresponding eight rows of a reference pixel frame (e.g., rows 1–8 of the current pixel block correspond to rows 1–8 of the reference pixel frame). The correspondence between rows is then shifted vertically by one row (i.e., rows 1–8 of the current pixel block now correspond to rows 2–9 of the reference pixel frame) and the method 1400 of FIG. 14 is repeated. This process is repeated until all rows are compared.

The method 1400 of FIG. 14 is entered at step 1405 and proceeds to step 1410. At step 1410 the first row of the current pixel block is stored in a first register. The method 1400 then proceeds to step 1415, where the first row and any overlap of the presently selected reference block is stored in a second register. The method 1400 then proceeds to step 1420.

At step 1420 a distortion between the contents of the first register and second register is calculated and stored as a partial distortion (i.e., partial with respect to the entire pixel block). That is, the first register and second register are XOR-ed together to produce a result. The number of "ones" in the result is accumulated to produce a value deemed to be a partial distortion. The partial distortion is then stored. The method 1400 then proceeds to step 1425.

At step 1425 the second register is shifted by one pixel value (i.e., N bits). The method 1400 then proceeds to step 1430 where a query is made as to whether a register boundary has been exceeded. That is, a query is made as to whether, due to the N-bit shift operation of step 1425, the row of pixels stored in the first register is no longer aligned with any (or insufficient) pixel(s) stored in the second register. If the query at step 1430 is answered negatively, then the method 1400 proceeds to step 1435. If the query at step 1430 is answered affirmatively, then the method 1400 proceeds to step 1440.

At step 1440 a new word and any overlap from the reference pixel frame is loaded into the second register. That is, a group of pixels that are horizontally contiguous (within the reference pixel frame) to the previously loaded pixels of the second register are loaded into the second register. The method 1400 then proceeds to step 1445, where the new word is formatted if necessary (i.e., if the new word does not conform to the packed data representation). The method 1400 then proceeds to step 1420.

At step 1435 a query is made as to whether the steps of calculating (step 1420) and shifting (step 1425) have been performed for each of the appropriate horizontal search positions (i.e., pixel positions in the reference pixel frame). If the query at step 1435 is answered negatively, then the method 1400 proceeds to step 1420. If the query at step 1435 is answered affirmatively, then the method 1400 proceeds to step 1450.

At step 1450 a query is made as to whether all the rows in the block have been examined. That is, a query is made as to whether the appropriate contiguous rows of pixels within the reference pixel frame have been compared to the corresponding current pixel block rows via the steps of calculating (step 1420) and shifting (step 1425). If the query at step 1450 is answered negatively, then the method 1400 proceeds to step 1455. If the query at step 1435 is answered affirmatively, then the method 1400 proceeds to step 1465.

At step 1455 the next row of the current pixel block is stored in the first register. The method 1400 then proceeds to step 1460, where the next row plus any overlap of the reference pixel block is stored in the second register. The method 1400 then proceeds to step 1420.

At step 1465, the stored partial distortions are processed to provide an indication of the correlation between the current pixel block and the reference pixel block. That is, the partial distortion values calculated for each horizontal position of the rows of the current pixel block are correlated to corresponding partial distortions calculated for each corresponding horizontal position of the other rows of the pixel block. In this manner, a global or full distortion value relating the current and reference pixel blocks may be determined.

The method 1400 of FIG. 1 is repeated for each of the vertical search positions in the reference pixel frame. It must be noted that the method 1400 of FIG. 14 compares the current pixel block to a plurality of horizontally contiguous pixel blocks. For example, in the case of a 4×4 pixel block being compared to a 4×6 reference block, three partial distortion measurements will be performed for each row. Thus, the effect is to compare each current pixel block row to corresponding rows of three distinct reference pixel blocks.

It is important to note that in the method 1400 of FIG. 14, the partial distortions corresponding to a particular horizontal search location are accumulated as they become available, thereby reducing the register requirements of a processing system performing a search.

One important embodiment of the invention is particularly useful in the case of a "register constrained" processing system, where the register resources are incapable of storing an entire current pixel block row, a corresponding reference block row (including any offset), and partial distortion measurements being processed. In such a system, the method 1400 of FIG. 14 may be adapted to process "batches" of horizontal search positions. For example, in the case of a 4×4 current pixel block and corresponding 4×9 reference pixel blocks, the method 1400 may be used to process each row twice. Specifically, instead of performing six comparisons of the current row to the reference row, the method 1400 is adapted to perform two sets of three comparisons. In this manner, the resources required to store pixel data and accumulate distortion results are reduced.

Figure 7:
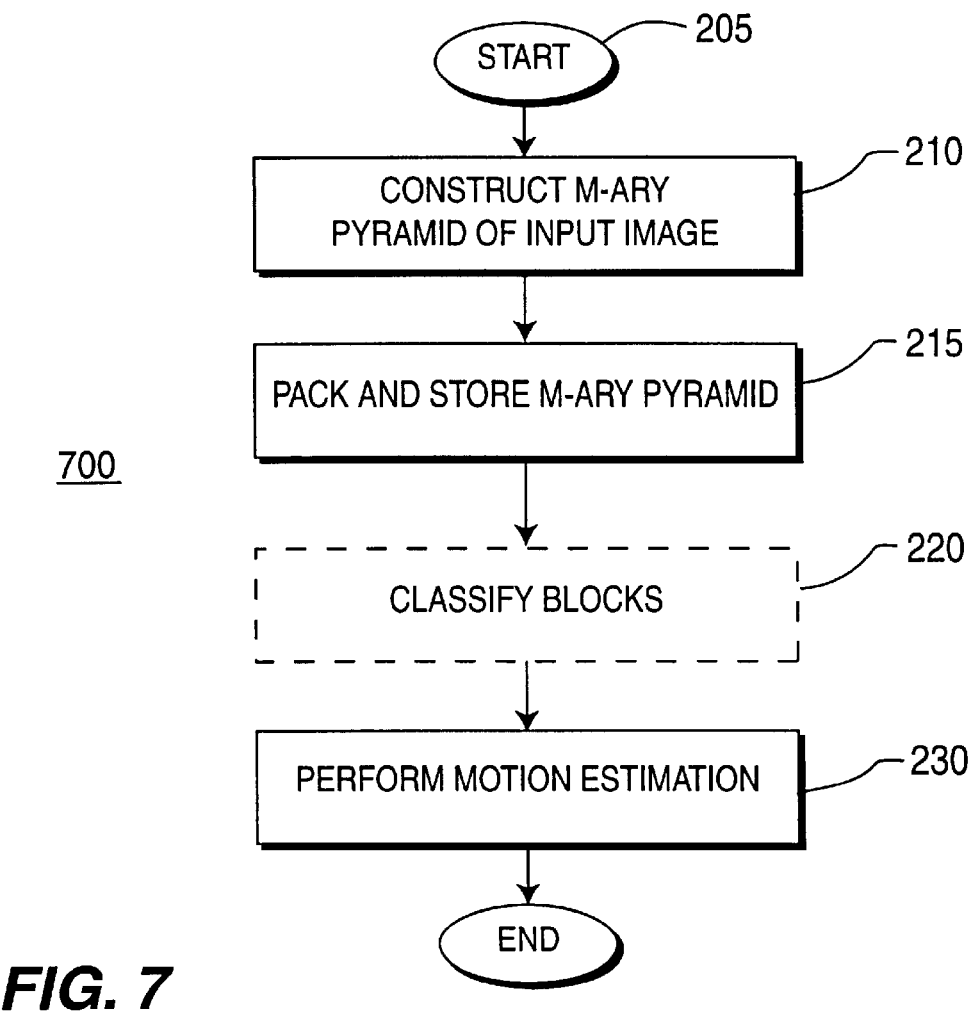
FIG. 7 illustrates a flowchart of a method for reducing the computational complexity in determining motion vectors for block-based motion estimation.

FIG. 7 illustrates a flowchart of a method for reducing the computational complexity in determining motion vectors for block-based motion estimation. The method 700 is entered at step 205 and proceeds to step 210, where an M-ary pyramid of an image is constructed. The method 700 then proceeds to step 215.

At step 215 the M-ary pyramid constructed at step 210 is packed and stored in, e.g., the manner described above with respect to FIG. 12. The method 700 then proceeds to optional step 220.

At optional step 220, the blocks within the M-ary pyramid are classified in the manner described above with respect to FIG. 2. The method 700 then proceeds to step 230.

At step 230, a motion estimation is performed in the manner described above with respect to FIG. 2 and FIG. 13. That is, the motion estimation method and packed domain searching method are used together to effect an efficient motion estimation and search method. For example, the motion estimation methods described with respect to FIG. 2 may be used to provide zero search vector refinements to the search method described above with respect to FIG. 13. The method 700 then proceeds to step 235 where it is exited.

In one embodiment of the invention, the packing of data is performed "on the fly." That is, the shift and OR operations performed during, e.g., respective steps 1206 and 1208 within the context of the packing method 1200 may be performed while an M-ary pyramid is computed (for, e.g., the pyramid computation). In this manner, the memory bandwidth utilization and storage of unpacked M-ary values is avoided. For example, in the method 700 of FIG. 7, steps 210 and 215 may be merged such that step 210 is constructing an M-ary pyramid of a portion of a reference frame while step 215 is packing and storing a previously constructed portion of an M-ary pyramid (i.e., previously processed by step 210).

It is important to note that general-purpose processor architectures cannot fully exploit the data reduction realized by using binary pyramids and other M-ary pyramids. The above-described invention provides several important advantages over the prior art. First, by processing data within the packed data domain rather than the unpacked data domain, the memory bandwidth requirements are considerable reduced. Second, packed data domain processing as described above reduces the number of load instructions needed for motion estimates. Third, packed data domain processing as described above reduces the number of arithmetic operation required to implement a particular function, such as the above-described matching function (compared to an equivalent 8-bit based matching function). These and other benefits will be readily appreciated by those skilled in the art.

Although various embodiments which incorporate the teachings of the present invention have been shown and described in detail herein, those be skilled in the art can readily devise many other varied embodiments that still incorporate these teachings.

What is claimed is:

1. A method for determining whether a pixel block is substantially similar to a group of pixels within a reference pixel frame, said pixel block comprising a plurality of pixels rows, said method comprising the steps of:

(a) loading, into a first register, a packed data representation of at least a portion of a row of pixels within said pixel block, wherein said packed data representation comprises representation of said pixels within a mean or an M-ary pyramid;

(b) loading, into a second register, a packed data representation of at least a portion of a corresponding row of pixels within said reference image;

(c) comparing, for each of a plurality of search positions, said packed data pixel representations of said first and second registers to produce a respective plurality of partial distortion measurements;

(d) repeating, for each remaining portion of each row of pixels within said pixel block, steps (a), (b) and (c); and (e) determining, using said produced plurality of partial distortion measurements, whether said pixel block is substantially similar to a group of pixels within said corresponding rows of pixels within said reference image.

2. The method of claim 1, further comprising the steps of:

(f) vertically shifting a correspondence of said pixel block rows and said reference image rows, and (g) repeating steps (a), (b), (c), (d) and (e).

3. The method of claim 2, wherein steps (f) and (g) are repeated for each of a plurality of vertical search positions.

4. The method of claim 1, wherein said step of loading said first register comprises the step of loading a packed data representation of an entire row of pixels into said first register.

5. The method of claim 1, wherein said first and second registers comprise respective first and second groupings of registers within a register file, and wherein:

said step of loading said first register comprises the step of loading, into said first register group, a packed data representation of said pixel block; and said step of loading said second register comprises the step of loading, into said second register group, a packed data representation of at least a portion of said rows of pixels within said reference image corresponding to said rows of pixels within said pixel block.

6. The method of claim 1, wherein said step of repeating comprises the steps of:

shifting said second register contents by N bits, where N is the number of bits representing a single pixel; and in the case of a boundary of said second register being exceeded prior to loading each portion of said packed data representation said corresponding row of pixels within said reference image:

loading, into said second register, an additional portion of said packed data representation said corresponding row of pixels within said reference image.

7. The method of claim 1, wherein said packed data representation of said pixel block is formed according to the steps of:

(1) storing, in a word having a predefined size, a first N-bit representation of a pixel, where N is an integer;

(2) shifting, by N bits, said word;

(3) logically OR-ing said word with an N-bit representation of an additional pixel; and (4) repeating said steps of shifting and logically OR-ing until said word size limit is reached.

8. The method of claim 7, wherein said N-bit pixel representations comprise N-bit representations of pixels within said M-ary pyramid.

9. The method of claim 8, wherein:

said packed data representation of said pixel block is formed while an M-ary pyramid including said N-bit pixel representations is generated.

10. The method of claim 7, wherein said formed word comprises a row of pixels within a pixel block.

11. The method of claim 7, wherein said N-bit pixel representations are associated with a reference image, and said method further comprises the steps of:

(5) storing, in a memory, said formed word; and (6) repeating, for each of a plurality of N-bit pixel representations forming a reference image, steps (1), (2), (3), (4) and (5), to form a packed data representation of a reference image.

12. The method of claim 1, wherein said step of comparing comprises the steps of:

performing, for each of said plurality of search positions, a logical XOR between said first and second registers; and summing, for each of said plurality of search positions, the differences between the pixel information stored within said first register and the corresponding pixel information stored within said second register.

13. The method of claim 1, wherein:

said step of comparing comprises the step of calculating, for each of said plurality of search positions, a sum of absolute differences (SAD); and said step of determining comprises the steps of:

comparing said SAD associated with each pixel position and with each search position to appropriate threshold values; and in the case of said threshold values not being exceeded for a particular search position, determining that said pixel block is substantially similar to a group of pixels represented by said particular search position.

14. In a block-based system for encoding a sequence of images to produce a sequence of compressed images including predicted image blocks and associated motion vectors, a method comprising the steps of:

packing, into each of a first plurality of data structures, pixel data related to at least two pixels within an image frame, said first plurality of data structures comprising pixel data forming said image frame, said image frame comprising one of an original resolution image frame or a reduced resolution image frame, wherein said pixel data comprises representation of said pixel data within a mean or an M-ary pyramid;

storing, in a memory, said first plurality of data structures to form a stored image frame;

formatting, into each of a second plurality of data structures, pixel data related to at least two pixels within a pixel block, said second plurality of data structures comprising pixel data forming said pixel block; and comparing said second plurality of data structures to corresponding portions of said first plurality of data structures until a match is found.

15. The method of claim 14, wherein said step of comparing comprises the steps of:

loading, into a first register, said second plurality of data structures; and repeating the following steps until an error indicium is below a threshold level:

loading, into a second register, a first corresponding portion of said first plurality of data structures;

logically comparing said first and second registers to produce said error indicia;

in the case of said error indicia exceeding said threshold level, loading, into said second register, a next corresponding portion of said first plurality of data structures, said next corresponding portion representing a pixel block offset from said first corresponding portion by at least one of a horizontal and vertical pixel offset.

16. A method for determining whether a pixel block having a plurality of pixel rows is substantially similar to a group of pixels within a reference image, said method comprising the steps of:

(a) loading, into a first register, a packed data representation of a row of pixels within said pixel block, wherein said packed data representation comprises representation of said pixels within a mean or an M-ary pyramid;

(b) loading, into a second register, a packed data representation of at least a portion of a corresponding row of pixels within said reference image;

(c) comparing, for each of a plurality of pixel positions, said first and second registers to produce a respective plurality of partial distortion measurements; and (d) repeating, for each row of pixels within said pixel block, steps (a), (b) and (c) until each of said rows of pixels within said pixel block group of pixels representing said current pixel block has been compared to said corresponding group of pixels within said reference image;

(e) determining, using said produced plurality of partial distortion measurements, whether said pixel block is substantially similar to any of said third plurality of pixel groups within said reference image.

17. The method of claim 16, wherein said step of comparing comprises the steps of:

performing, for each of said third plurality of pixel positions, a logical XOR between said first and second registers; and summing, for each of said third plurality of pixel positions, the differences between the pixel information stored within said first register and the corresponding pixel information stored within said second register.

18. The method of claim 16, further comprising the steps of:

(f) loading, into said second register, a packed data representation of a second plurality of horizontally contiguous pixels within a next group of pixels in said reference image; and (g) repeating steps (a), (b), (c), (d), (e) and (f) until one of the following conditions occurs:
a determination is made that said pixel block is substantially similar to a group of pixels within said examined portion of said reference image; and
a determination is made that said pixel block is not substantially similar to any group of pixels within said examined portion of said reference image.

19. In a system for determining whether a pixel block having a plurality of pixel rows is substantially similar to a group of pixels within a reference image, a method comprising the steps of:

generating, from said reference images, one or more M-ary pyramids;

formatting, according to a packed data structure, said generated M-ary pyramids;

storing, in a memory, said one or more M-ary pyramids formatted according to said packed data structure; and determining whether a pixel block formatted according to said packed data structure is substantially similar to a group of pixels within one or more of said M-ary pyramids formatted according to said packed data structure.

20. The method of claim 19, wherein each of said step of formatting comprises the steps of packing, into a single word, pixel information representing a row of pixels within a pixel block.

21. The method of claim 19, wherein said step of determining comprises the steps of:

(a) loading, into a first register group, said pixel block formatted according to said packed data structure, said pixel block having a first plurality of rows;

(b) loading, into a second register group, of at least a portion of a corresponding first plurality of pixel rows within an M-ary pyramid formatted according to said packed data structure;

(c) comparing, for each of a plurality of search positions, said packed data pixel representations of said first and second registers to produce a respective plurality of distortion measurements;

(d) repeating, for any remaining portion of said corresponding first plurality of pixel rows within said M-ary pyramid, steps (b) and (c); and (e) determining, using said produced plurality of distortion measurements, whether said pixel block is substantially similar to a group of pixels within said corresponding first plurality of pixel rows within said M-ary pyramid.

22. The method of claim 21, further comprising the steps of:

(f) vertically shifting a correspondence of said pixel block rows and said reference image rows, and (g) repeating steps (a), (b), (c), (d) and (e).

23. The method of claim 19, wherein said step of determining comprises the steps of:

(a) loading, into a first register, at least a portion of a row of pixels within said pixel block formatted according to said packed data structure;

(b) loading, into a second register, at least a portion of a corresponding row of pixels within said M-ary pyramid formatted according to said packed data structure;

(c) comparing, for each of a plurality of search positions, said packed data pixel representations of said first and second registers to produce a respective plurality of partial distortion measurements;

(d) repeating, for any remaining portion of said corresponding row of pixels within said M-ary pyramid, steps (b) and (c);

(e) repeating, for any remaining portion of said row of pixels within said pixel block formatted according to said packed data structure, steps (a) (b) and (c);

(f) determining, using said produced plurality of distortion measurements, whether said pixel block is substantially similar to a group of pixels within said corresponding first plurality of pixel rows within said M-ary pyramid.

24. The method of claim 23, further comprising the steps of:

(g) vertically shifting a correspondence of said pixel block rows and said reference image rows, and (h) repeating steps (a), (b), (c), (d), (e) and (f).

* * * * *